(12) United States Patent
Hayashi et al.

(10) Patent No.: US 10,921,069 B2
(45) Date of Patent: Feb. 16, 2021

(54) STACKING-TYPE HEADER AND METHOD OF MANUFACTURING STACKING-TYPE HEADER

(71) Applicant: Mitsubishi Electric Corporation, Tokyo (JP)

(72) Inventors: Takehiro Hayashi, Tokyo (JP); Tomoyuki Hayashi, Tokyo (JP); Norihiro Yoneda, Tokyo (JP); Kenichi Kitani, Tokyo (JP); Shinya Higashiiue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/300,621

(22) PCT Filed: Aug. 8, 2016

(86) PCT No.: PCT/JP2016/073334
§ 371 (c)(1),
(2) Date: Nov. 12, 2018

(87) PCT Pub. No.: WO2018/029761
PCT Pub. Date: Feb. 15, 2018

(65) Prior Publication Data
US 2019/0154365 A1    May 23, 2019

(51) Int. Cl.
*F28F 9/02* (2006.01)
*B21D 39/06* (2006.01)
(Continued)

(52) U.S. Cl.
CPC ............ *F28F 9/0221* (2013.01); *B21D 39/06* (2013.01); *B21D 53/08* (2013.01); *B23K 1/00* (2013.01);
(Continued)

(58) Field of Classification Search
CPC .......... F28F 9/001; F28F 9/002; F28F 9/0221; F28F 9/182; F28F 2275/02;
(Continued)

(56) References Cited

U.S. PATENT DOCUMENTS 3,496,629 A * 2/1970 Martucci ................... F28F 9/16
228/168
3,979,810 A * 9/1976 Krips ..................... B21D 39/06
29/890.044
(Continued)

FOREIGN PATENT DOCUMENTS

JP    S50-037026 A    4/1975
JP    S50-078952 A    6/1975
(Continued)

OTHER PUBLICATIONS

International Search Report of the International Searching Authority dated Nov. 1, 2016 for the corresponding international application No. PCT/JP2016/073334 (and English translation).

*Primary Examiner* — Jianying C Atkisson
*Assistant Examiner* — Jose O Class-Quinones
(74) *Attorney, Agent, or Firm* — Posz Law Group, PLC

(57) ABSTRACT

A stacking-type header includes a first plate having a first through-hole; a second plate having a plurality of second through-holes; a third plate in which a flow path that communicates between the first through-hole and the second through-holes is formed, a first pipe including a first end portion that is inserted into the first through-hole; a plurality of second pipes each including a second end portion that is inserted into a corresponding one of the second through-holes; and brazing portions. The first pipe includes a first expanded portion in the first end portion, the first expanded portion having an outer peripheral surface that is pressed against an inner peripheral surface of the first through-hole. Each of the second pipes includes a second expanded portion having an outer peripheral surface that is pressed against an inner peripheral surface of a corresponding one of the second through-holes.

8 Claims, 25 Drawing Sheets

(51) Int. Cl.
*B21D 53/08* (2006.01)
*B23K 1/00* (2006.01)
*F28F 9/18* (2006.01)
*F28D 1/053* (2006.01)
*B23K 101/14* (2006.01)

(52) U.S. Cl.
CPC ........ *B23K 1/0012* (2013.01); *F28D 1/05316* (2013.01); *F28F 9/182* (2013.01); *B23K 2101/14* (2018.08); *F28F 2275/045* (2013.01); *F28F 2275/125* (2013.01)

(58) Field of Classification Search
CPC ............ F28F 2275/04; F28F 2275/125; B23K 1/0012; B23K 2101/14; B21D 39/06; B21D 53/08; B21D 31/04
USPC .................................................... 29/890.044
See application file for complete search history.

(56) References Cited

U.S. PATENT DOCUMENTS

| | | | | |
|---|---|---|---|---|
| 4,579,171 A | * | 4/1986 | Stafford | F28F 9/182 165/115 |
| 4,706,356 A | * | 11/1987 | Bianchi | B24C 3/325 29/890.051 |
| 4,832,377 A | * | 5/1989 | Umehara | F16L 23/024 285/222 |
| 5,400,951 A | * | 3/1995 | Shiroyama | B23K 33/004 228/168 |
| 5,960,864 A | * | 10/1999 | Morita | B23K 1/0012 165/173 |
| 2006/0185167 A1 | * | 8/2006 | Lippa, Jr. | B23K 1/0012 29/890.038 |
| 2009/0139089 A1 | * | 6/2009 | Miyazaki | B21D 39/06 29/890.044 |
| 2011/0226453 A1 | * | 9/2011 | Pierce | F28D 1/05333 165/173 |
| 2014/0338874 A1 | * | 11/2014 | Jindou | F28F 9/0204 165/173 |
| 2016/0076825 A1 | * | 3/2016 | Matsuda | F28F 9/0278 165/148 |
| 2016/0245596 A1 | | 8/2016 | Higashiiue et al. | |

FOREIGN PATENT DOCUMENTS

| | | |
|---|---|---|
| JP | S52-135435 U | 10/1977 |
| JP | S59-113970 A | 6/1984 |
| JP | H09-133491 A | 5/1997 |
| JP | H09-189463 A | 7/1997 |
| WO | 2015/063857 A1 | 5/2015 |

* cited by examiner

STACKING-TYPE HEADER AND METHOD OF MANUFACTURING STACKING-TYPE HEADER

CROSS REFERENCE TO RELATED APPLICATION

This application is a U.S. national stage application of PCT/JP2016/073334 filed on Aug. 8, 2016, the contents of which are incorporated herein by reference.

TECHNICAL FIELD

The present invention relates to a stacking-type header that distributes refrigerant to a plurality of flow paths or joins flows of refrigerant out of the flow paths and to a method of manufacturing the stacking-type header.

BACKGROUND ART

Some existing stacking-type headers distribute refrigerant to a plurality of flow paths, such as heat transfer tubes of a heat exchanger, or join flows of refrigerant out of the flow paths (see, for example, Patent Literature 1). Such a stacking-type header includes, for example, a first plate having one first through-hole; a second plate having a plurality of second through-holes; a third plate in which a flow path that communicates between the first through-hole and the second through-holes is formed, the third plate being held between the first plate and the second plate; a first pipe inserted into the first through-hole; and a plurality of second pipes inserted into the second through-holes. That is, the stacking-type header distributes refrigerant that has flowed into the first pipe to the second pipes. Moreover, the stacking-type header joins flows of refrigerant that has flowed into the second pipes and discharges the refrigerant from the first pipe.

CITATION LIST

Patent Literature

Patent Literature 1: Japanese Unexamined Patent Application Publication No. 9-189463

SUMMARY OF INVENTION

Technical Problem

In existing stacking-type headers, such as the one described above, the plates of the stacking-type header are brazed together. The plates are joined together by heating and melting brazing materials applied (cladded) to surfaces of the plates and by forming fillets on outer peripheries of the plates or on inner peripheries of openings of the plates by surface tension.

Moreover, the first plate and the first pipe, which is inserted into the first through-hole of the first plate, are brazed to each other. The second plate and the second pipes, which are inserted into the second through-holes of the second plate, are brazed to each other. The plates and the first and second pipes are joined together by heating and melting brazing materials, which are placed beforehand in the vicinity of joint portions between the plates and the first and second pipes, and by forming fillets on outer peripheries of the joint portions between the plates and the first and second pipes.

Brazing of the plates and brazing of the plates and the first and second pipes are performed simultaneously. To be specific, the first plate, the third plate, and the second plate are stacked with brazing materials placed therebetween. The stacked plates are fixed together by using a jig. The first plate and the first pipe, which has been inserted into the first through-hole of the first plate, are fixed together by using another jig; and the second plate and the second pipes, which have been inserted into the second through-holes of the second plate, are fixed together by using another jig. Subsequently, by heating these components of the stacking-type header, which have been fixed together by using the jigs, the components are brazed together, and the stacking-type header is completed.

As described above, when brazing the components of an existing stacking-type header together, it is necessary to use jigs for fixing the first and second pipes. That is, it is necessary to heat the components of the existing stacking-type header in a state in which jigs for fixing the first and second pipes are attached to the components. Therefore, existing stacking-type headers have a problem in that it is necessary to apply additional heat in an amount corresponding to the heat capacity of the jigs for fixing the first and second pipes and therefore it takes time to perform brazing.

An object of the present invention, which has been devised to solve the above problem, is to obtain a stacking-type header that can reduce heating time for brazing and that can be manufactured with high efficiency and a method of manufacturing the stacking-type header.

Solution to Problem

A stacking-type header of an embodiment of the present invention includes a first plate having a first through-hole; a second plate having a plurality of second through-holes; a third plate in which a flow path that communicates between the first through-hole and the second through-holes is formed, the third plate being disposed between the first plate and the second plate; a first pipe including a first end portion inserted into the first through-hole; a plurality of second pipes each including a second end portion inserted into a corresponding one of the second through-holes; and brazing portions provided between the first plate and the third plate, between the second plate and the third plate, between the first through-hole and the first pipe, and between the second through-holes and the second pipes, wherein the first pipe includes a first expanded portion in the first end portion, the first expanded portion having an outer peripheral surface pressed against an inner peripheral surface of the first through-hole, and wherein each of the second pipes includes a second expanded portion in the second end portion, the second expanded portion having an outer peripheral surface pressed against an inner peripheral surface of a corresponding one of the second through-holes.

A method of manufacturing the stacking-type header of the embodiment of the present invention includes a first brazing material placing step of placing a brazing material for joining the first through-hole and the first pipe to each other; a first pipe fixing step of inserting the first end portion of the first pipe into the first through-hole of the first plate and fixing the first pipe to the first through-hole by forming the first expanded portion by expanding the first end portion; a second brazing material placing step of placing a brazing material for joining each of the second through-holes and a corresponding one of the second pipes to each other; a second pipe fixing step of inserting the second end portion of each of the second pipes into a corresponding one of the second through-holes of the second plate and fixing the second pipe to the second through-hole by forming the second expanded portion by expanding the second end portion; a stacking step of stacking the first plate to which the first pipe is fixed, the third plate, and the second plate to which the second pipes are fixed, in a state in which brazing materials are disposed between the plates; and a joining step of brazing the first plate and the third plate to each other, the second plate and the third plate to each other, the first through-hole and the first pipe to each other, and each of the second through-holes and a corresponding one of the second pipes to each other by fixing the first plate, the third plate, and the second plate that are stacked by using a jig and heating the first plate, the third plate, and the second plate. The joining step is performed after the first pipe fixing step, the first brazing material placing step, the second pipe fixing step, the second brazing material placing step, and the stacking step.

Advantageous Effects of Invention

With the embodiment of the present invention, before performing brazing, that is, heating, it is possible to fix the first pipe to the first through-hole of the first plate at the first expanded portion. With the embodiment the present invention, before performing brazing, that is, heating, it is possible to fix the second pipes to the second through-holes of the second plate at the second expanded portions. Therefore, with the embodiment of the present invention, when performing brazing, that is, heating, jigs for fixing the first pipe and the second pipes in place are not necessary. Accordingly, with the embodiment of the present invention, heating time for brazing can be reduced and the efficiency in manufacturing the stacking-type header can be improved.

DESCRIPTION OF EMBODIMENTS

Embodiment 1

Figure 1:
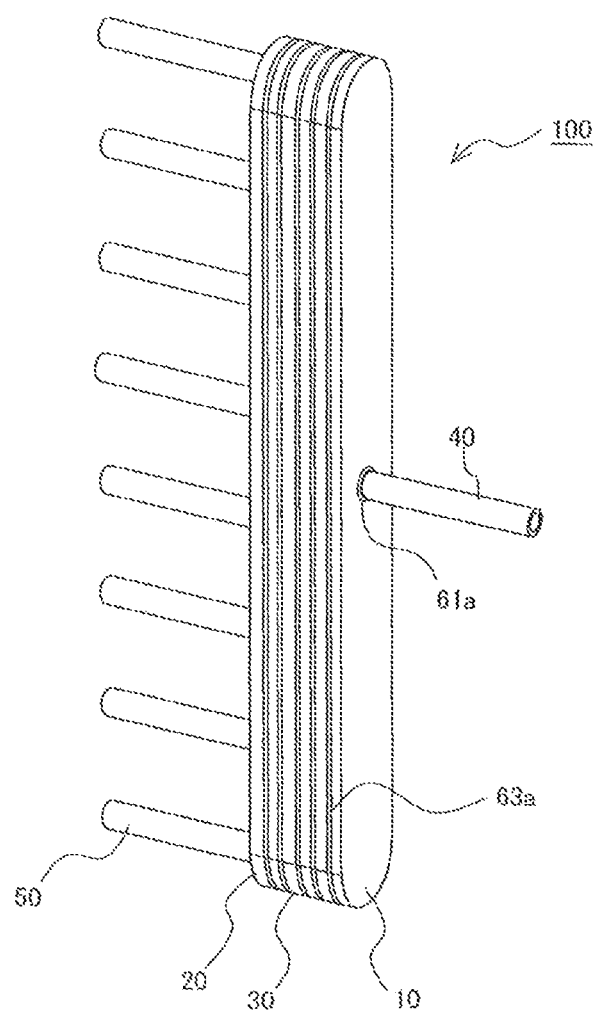
FIG. 1 is a perspective view of a stacking-type header according to Embodiment 1 of the present invention seen from the first pipe side.
Figure 2:
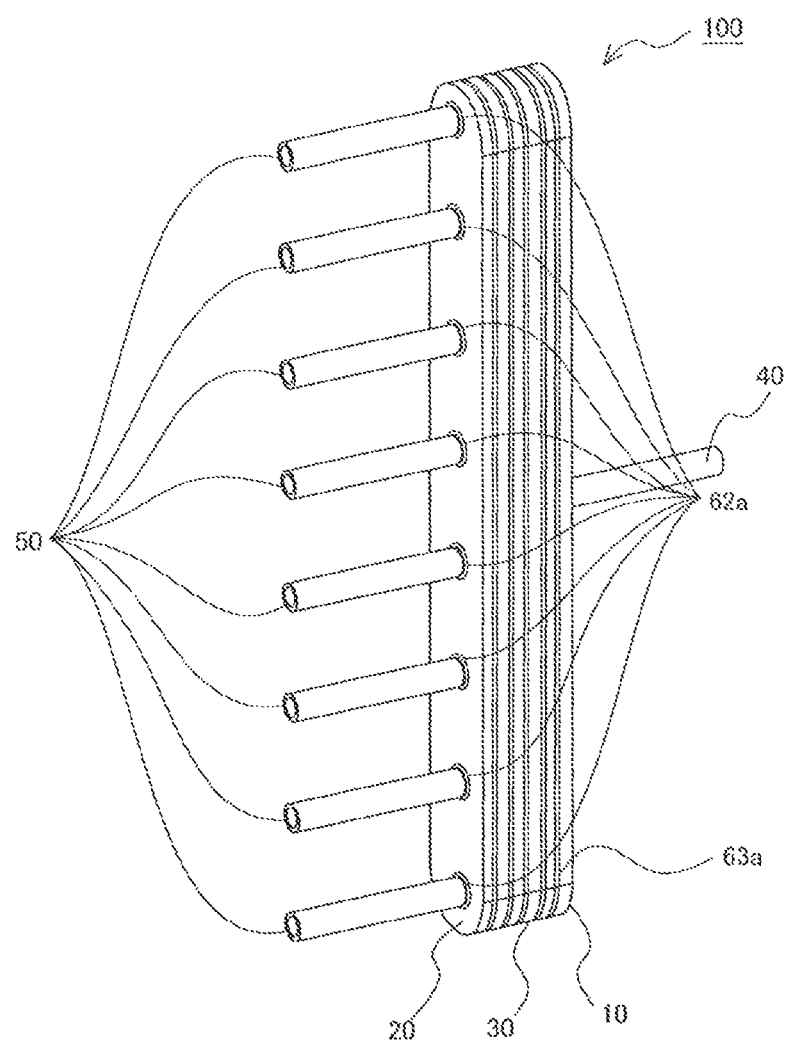
FIG. 2 is a perspective view of the stacking-type header according to Embodiment 1 of the present invention seen from the second pipe side.
Figure 3:
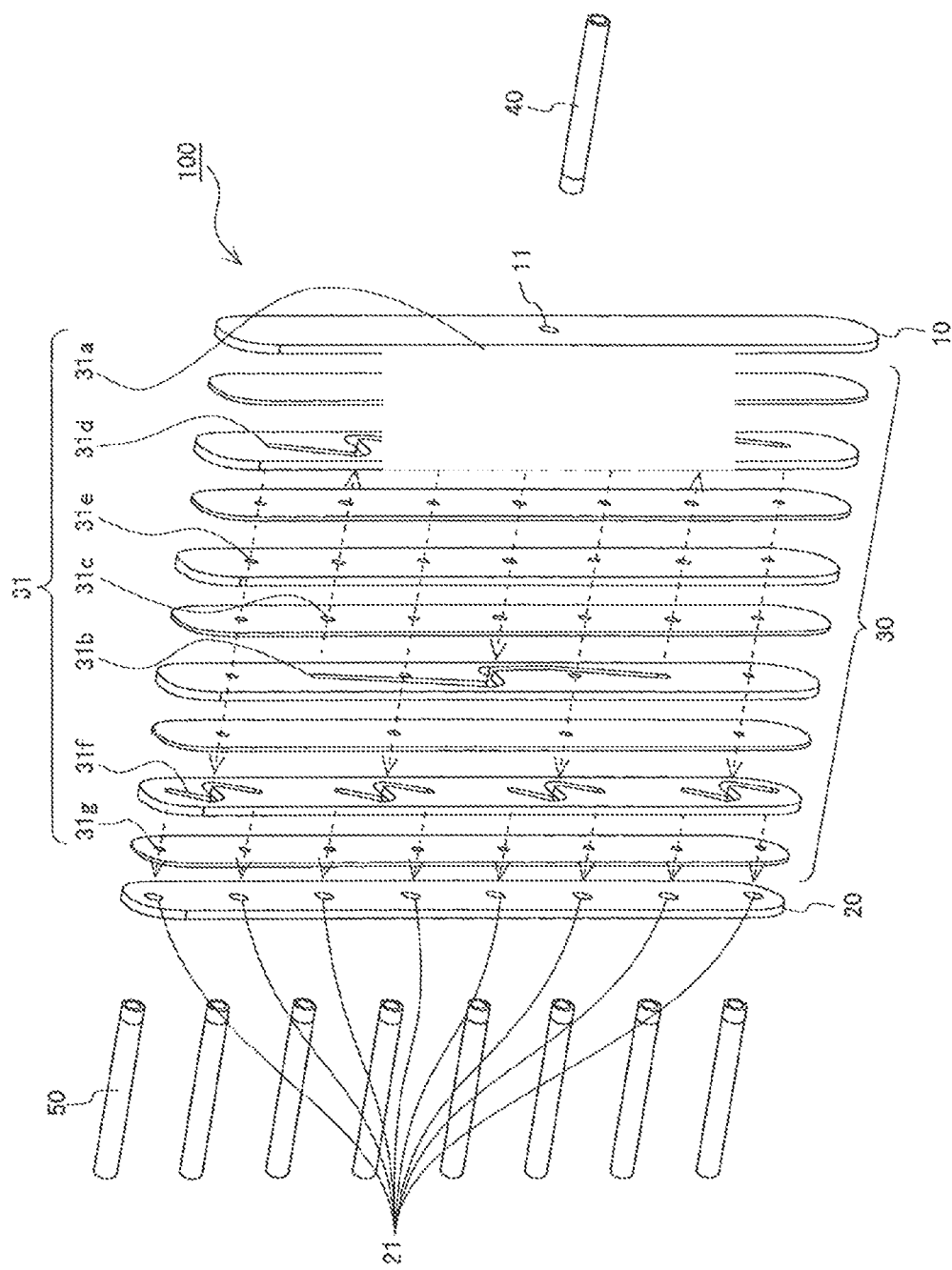
FIG. 3 is an exploded perspective view of the stacking-type header according to Embodiment 1 of the present invention.
Figure 4:
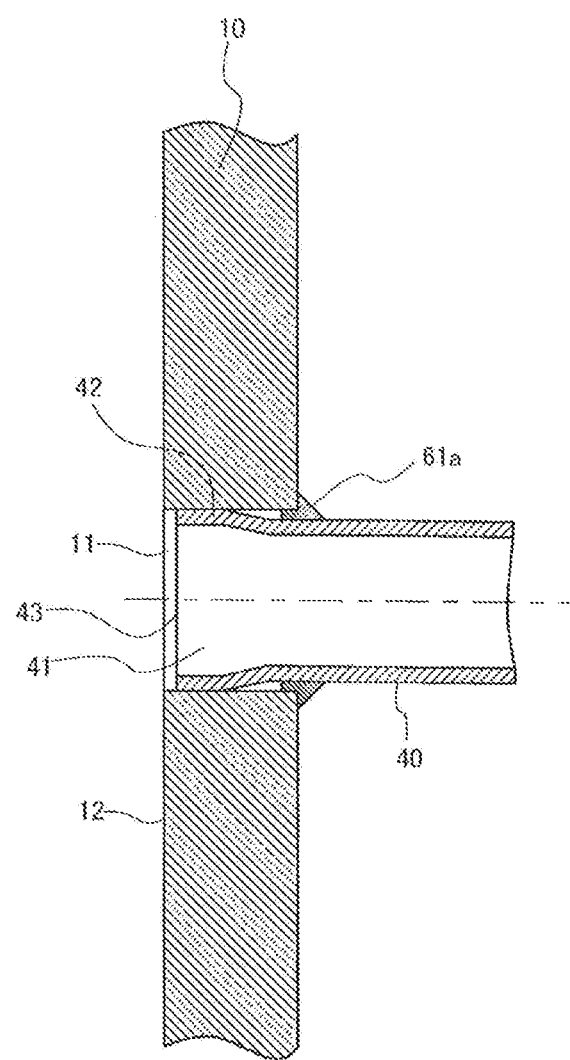
FIG. 4 is a sectional view illustrating a region in the vicinity of a joint portion between a first plate and a first pipe of the stacking-type header according to Embodiment 1 of the present invention.
Figure 5:
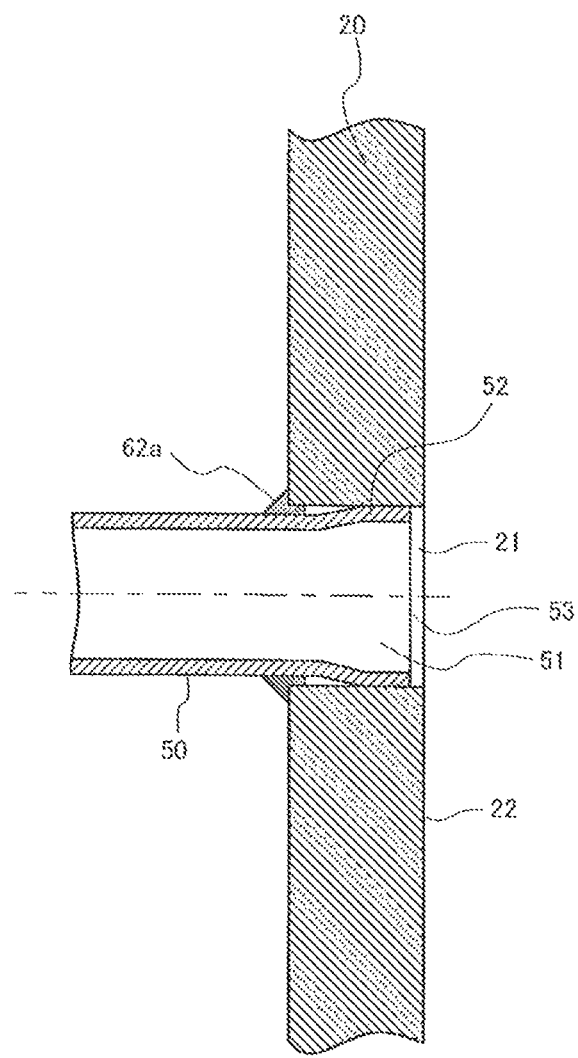
FIG. 5 is a sectional view illustrating a region in the vicinity of a joint portion between a second plate and a second pipe of the stacking-type header according to Embodiment 1 of the present invention.

FIG. 1 is a perspective view of a stacking-type header according to Embodiment 1 of the present invention seen from the first pipe side. FIG. 2 is a perspective view of the stacking-type header seen from the second pipe side. FIG. 3 is an exploded perspective view of the stacking-type header. FIG. 4 is a sectional view illustrating a region in the vicinity of a joint portion between a first plate and a first pipe of the stacking-type header. FIG. 5 is a sectional view illustrating a region in the vicinity of a joint portion between a second plate and a second pipe of the stacking-type header. In FIG. 3, brazing portions are not illustrated.

A stacking-type header 100 according to Embodiment 1 distributes refrigerant that has flowed into a first pipe 40 to a plurality of second pipes 50. Alternatively, the stacking-type header 100 joins flows of refrigerant that has flowed into the second pipes 50 and discharges the refrigerant from the first pipe 40. In Embodiment 1, one first pipe 40 is provided. However, the number of first pipes 40 is not limited to one. As long as the number of first pipes 40 is smaller than the number of second pipes 50, the aforementioned function can be performed. Hereinafter, the structure of the stacking-type header 100 according to Embodiment 1 will be described in detail.

The stacking-type header 100 includes a first plate 10 to which the first pipe 40 is joined, a second plate 20 to which the plurality of second pipes 50 are joined, and third plates 30 disposed between the first plate 10 and the second plate 20.

The first plate 10 has a through-hole 11 in the same number (that is, one) as the first pipe 40. An end portion 41 of the first pipe 40 is inserted into the through-hole 11. As illustrated in FIG. 4, a brazing portion 61$a$, which joins the through-hole 11 of the first plate 10 and the first pipe 40 to each other, is disposed between the through-hole 11 and the first pipe 40. That is, the first pipe 40 is fixed to the through-hole 11 of the first plate 10 by the brazing portion 61$a$. As illustrated in FIG. 4, the first pipe 40 according to Embodiment 1 includes an expanded portion 42 in the end portion 41. The expanded portion 42 has an outer peripheral surface that is pressed against an inner peripheral surface of the through-hole 11. That is, the first pipe 40 is fixed to the through-hole 11 of the first plate 10 also by the expanded portion 42. In Embodiment 1, an end surface 43 of the end portion 41 of the first pipe 40 is positioned in the through-hole 11. The length of the expanded portion 42 disposed in the through-hole 11 is smaller than the length of the through-hole 11.

The through-hole 11 corresponds to a first through-hole in the present invention. The end portion 41 corresponds to a first end portion in the present invention. The expanded portion 42 corresponds to a first expanded portion in the present invention.

The second plate 20 has a plurality of through-holes 21 in the same number (that is, plural) as the second pipes 50. An end portion 51 of each of the second pipes 50 is inserted into a corresponding one of the through-holes 21. As illustrated in FIG. 5, a brazing portion 62$a$, which joins the through-hole 21 of the second plate 20 and the second pipe 50 to each other, is disposed between the through-hole 21 and the second pipe 50. That is, the second pipe 50 is fixed to the through-hole 21 of the second plate 20 by the brazing portion 62$a$. As illustrated in FIG. 5, the second pipe 50 according to Embodiment 1 includes an expanded portion 52 in the end portion 51. The expanded portion 52 has an outer peripheral surface that is pressed against an inner peripheral surface of the through-hole 21. That is, the second pipe 50 is fixed to the through-hole 21 of the second plate 20 also by the expanded portion 52. In Embodiment 1, an end surface 53 of the end portion 51 of the second pipe 50 is positioned in the through-hole 21. The length of the expanded portion 52 disposed in the through-hole 21 is smaller than the length of the through-hole 21.

The through-hole 21 corresponds to a second through-hole in the present invention. The end portion 51 corresponds to a second end portion in the present invention. The expanded portion 52 corresponds to a second expanded portion in the present invention.

A flow path 31 that communicates between the through-hole 11 of the first plate 10 and the through-holes 21 of the second plate 20 is formed in the third plates 30. In other words, the flow path 31 formed in the third plates 30 communicates between the first pipe 40 and the second pipes 50. Embodiment 1 includes a plurality of third plates 30. As illustrated in FIG. 3, the flow path 31 is formed by a through-hole 31$a$, a groove 31$b$, through-holes 31$c$, grooves 31$d$, through-holes 31$e$, grooves 31$f$, and through-holes 31$g$. In each of the third plates 30, at least one of the through-hole 31$a$, the groove 31$b$, the through-holes 31$c$, the grooves 31$d$, the through-holes 31$e$, the grooves 31$f$, and the through-holes 31$g$ is formed.

The through-hole 31$a$ communicates between the through-hole 11 of the first plate 10 and the groove 31$b$. Each of the through-holes 31$c$ communicates between the groove 31$b$ and a corresponding one of the grooves 31$d$. Each of the through-holes 31$e$ communicates between a corresponding one of the grooves 31$d$ and a corresponding one of the grooves 31$f$. Each of the through-holes 31$g$ communicates between a corresponding one of the grooves 31$f$ and a corresponding one of the through-holes 21 of the second plate 20. That is, refrigerant that has flowed into the first pipe 40 is distributed to the second pipes 50 through the through-hole 11 of the first plate 10, the through-hole 31$a$, the groove 31$b$, the through-holes 31$c$, the grooves 31$d$, the through-holes 31$e$, the grooves 31$f$, the through-holes 31$g$, and the through-holes 21 of the second plate 20. Flows of refrigerant that has flowed into the second pipes 50 gradually join as the refrigerant flows through the through-holes 21 of the second plate 20, the through-holes 31$g$, the grooves 31$f$, the through-holes 31$e$, the grooves 31$d$, the through-holes 31$c$, and the groove 31$b$. Then, the refrigerant flows through the through-hole 31$a$ and the through-hole 11 of the first plate 10 and is discharged from the first pipe 40.

If it is possible to form a flow path 31 that communicates between the through-hole 11 of the first plate 10 and the through-holes 21 of the second plate 20 in one third plate 30, only one third plate 30 may be disposed between the first plate 10 and the second plate 20.

The first plate 10 and one of the third plates 30 are joined to each other and the second plate 20 and one of the third plates 30 are joined to each other at brazing portions 63$a$ disposed therebetween. Since the stacking-type header 100 according to Embodiment 1 includes the plurality of third plates 30, the third plates 30 are also joined to each other at brazing portions 63$a$.

[Method of Manufacturing Stacking-Type Header 100]

Next, a method of manufacturing the stacking-type header 100 according to Embodiment 1 will be described.

Figure 6:
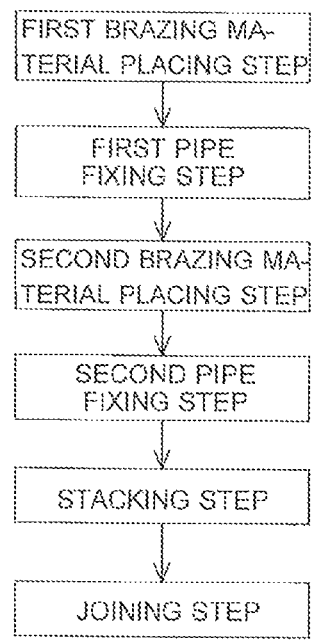
FIG. 6 illustrates a process of manufacturing the stacking-type header according to Embodiment 1 of the present invention.

FIG. 6 illustrates a process of manufacturing the stacking-type header according to Embodiment 1 of the present invention.

The stacking-type header 100 according to Embodiment 1 is completed through steps shown in FIG. 6. Hereinafter, the steps shown in FIG. 6 will be described with reference to the drawings.

Figure 7:
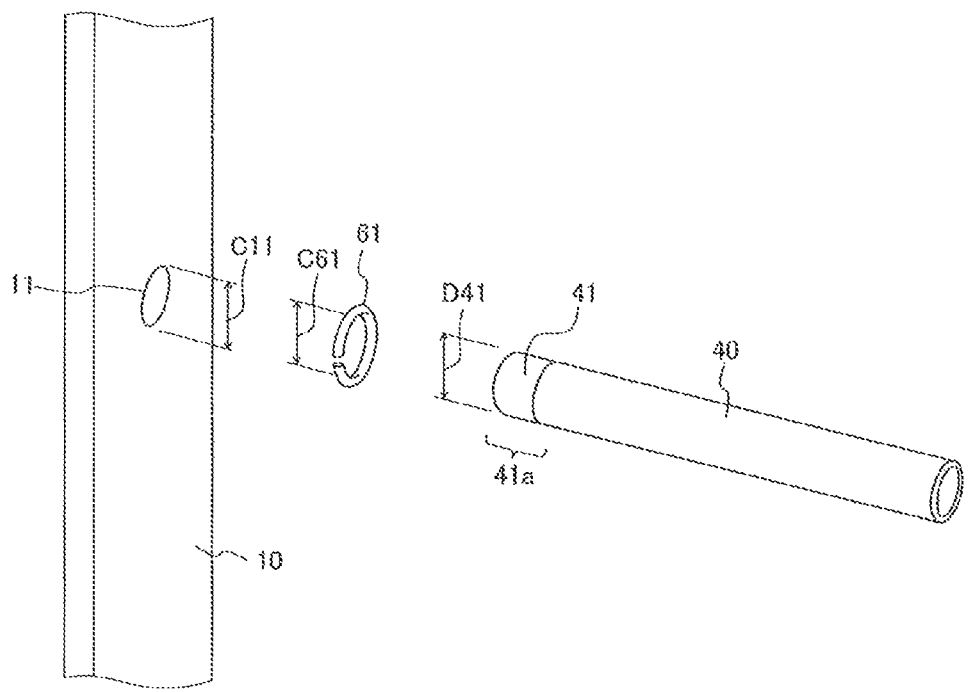
FIG. 7 illustrates a "first brazing material placing step" shown in FIG. 6.

FIG. 7 illustrates a "first brazing material placing step" shown in FIG. 6. FIG. 7 is a perspective view illustrating the first pipe 40, a brazing material 61, and a region in the vicinity of the through-hole 11 of the first plate 10.

Figure 8:
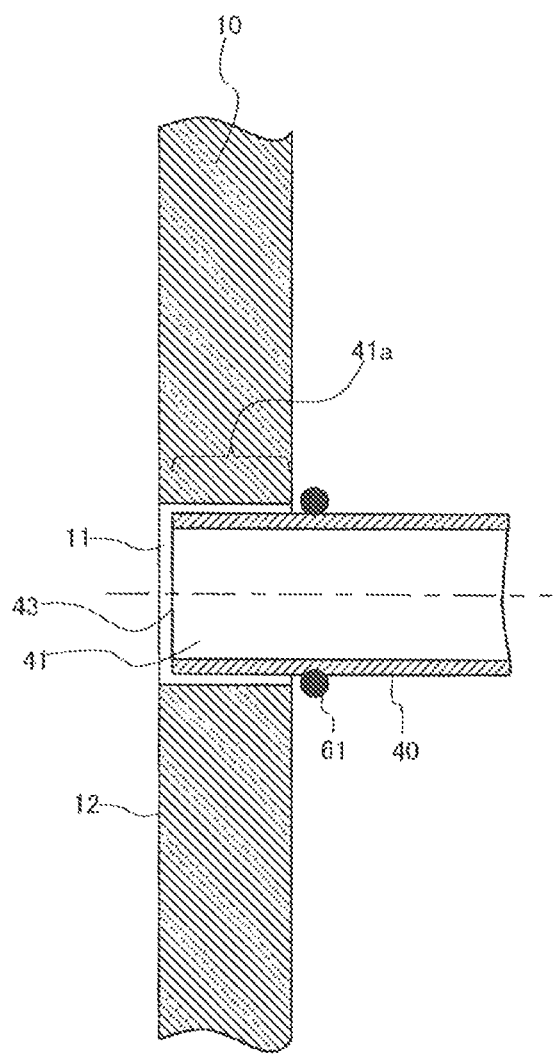
FIG. 8 illustrates a "first pipe fixing step" shown in FIG. 6.

In the first brazing material placing step, an operation of placing the brazing material 61 is performed. The brazing material 61 becomes the brazing portion 61$a$ described above when heated in the joining step described below. In Embodiment 1, an annular brazing material a part of which is cut is used as the brazing material 61. The brazing material 61 having such a shape can be obtained by, for example, forming a bar-shaped brazing material into an annular shape. The inner diameter C61 of the brazing material 61 is slightly smaller than the outer diameter of a part of the first pipe 40 at which the brazing material 61 is to be disposed. Therefore, it is possible to fix the brazing material 61 to a predetermined position by fitting the brazing material 61 onto the part of the first pipe 40 at which the brazing material 61 is to be disposed. As illustrated in FIG. 8 described below, when the first pipe 40 is inserted into the through-hole 11 of the first plate 10 to a fixed position, the brazing material 61 is fixed to a position in the vicinity of the opening of the through-hole 11.

A paste-like brazing material may be used as the brazing material 61. In this case, the brazing material 61 is applied, by using an applicator or other devices, to an outer peripheral surface of the first pipe 40 or a surface of the first plate 10 (surface from which the first pipe 40 protrudes) that is to be positioned in the vicinity of the opening of the through-hole 11 of the first plate 10 when the first pipe 40 is inserted into the through-hole 11 to a fixed position.

FIGS. 8 to 11 illustrate a "first pipe fixing step" shown in FIG. 6. FIGS. 8 to 11 are sectional views illustrating a region in the vicinity of the through-hole 11 of the first plate 10 in a state in which the first pipe 40 is inserted into the through-hole 11. Hereinafter, referring to FIGS. 8 to 11 and FIG. 7 described above, the first pipe fixing step will be described.

In the first pipe fixing step, the following operations (1) and (2) are performed:
(1) an operation of inserting the end portion 41 of the first pipe 40 into the through-hole 11 of the first plate 10; and
(2) an operation of fixing the first pipe 40 to the through-hole 11 by forming the expanded portion 42 by expanding the end portion 41 of the first pipe 40.

Figure 9:
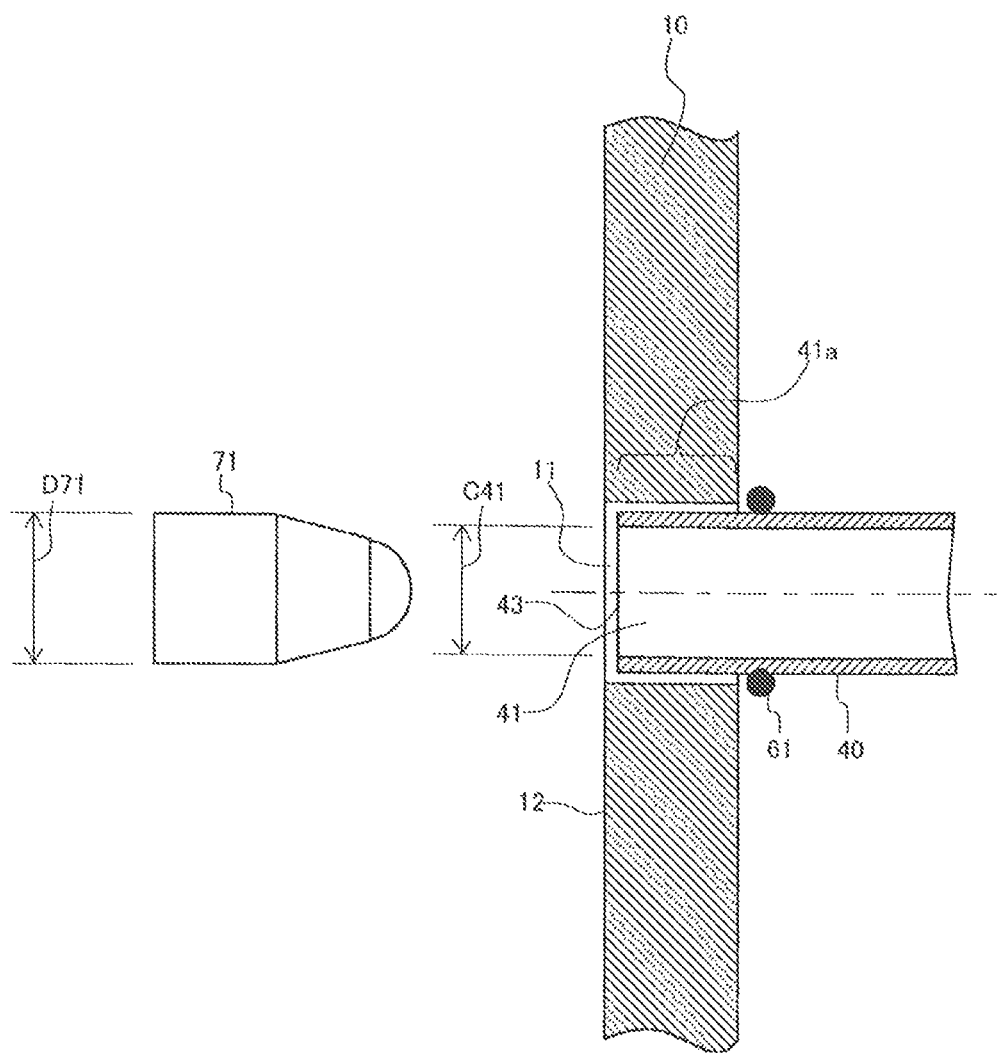
FIG. 9 illustrates the "first pipe fixing step" shown in FIG. 6, continuing from FIG. 8.

As illustrated in FIGS. 8 and 9, when inserting the end portion 41 of the first pipe 40 into the through-hole 11 of the first plate 10, an insertion section 41a of the first pipe 40 is inserted into the through-hole 11. At this time, in Embodiment 1, the end portion 41 of the first pipe 40 is inserted into the through-hole 11 of the first plate 10 until the end surface 43 of the end portion 41 of the first pipe 40 reaches a position in the through-hole 11. As illustrated in FIG. 7, in Embodiment 1, the inner diameter C11 of the through-hole 11 of the first plate 10 is slightly larger than the outer diameter D41 of the insertion section 41a of the first pipe 40. Therefore, the operation of inserting the end portion 41 of the first pipe 40 into the through-hole 11 of the first plate 10 is facilitated, and the efficiency in manufacturing the stacking-type header 100 can be improved. The operation of inserting the end portion 41 of the first pipe 40 into the through-hole 11 of the first plate 10 is performed, for example, by hand. Needless to say, the end portion 41 of the first pipe 40 may be inserted into the through-hole 11 of the first plate 10 by using a machine.

Figure 10:
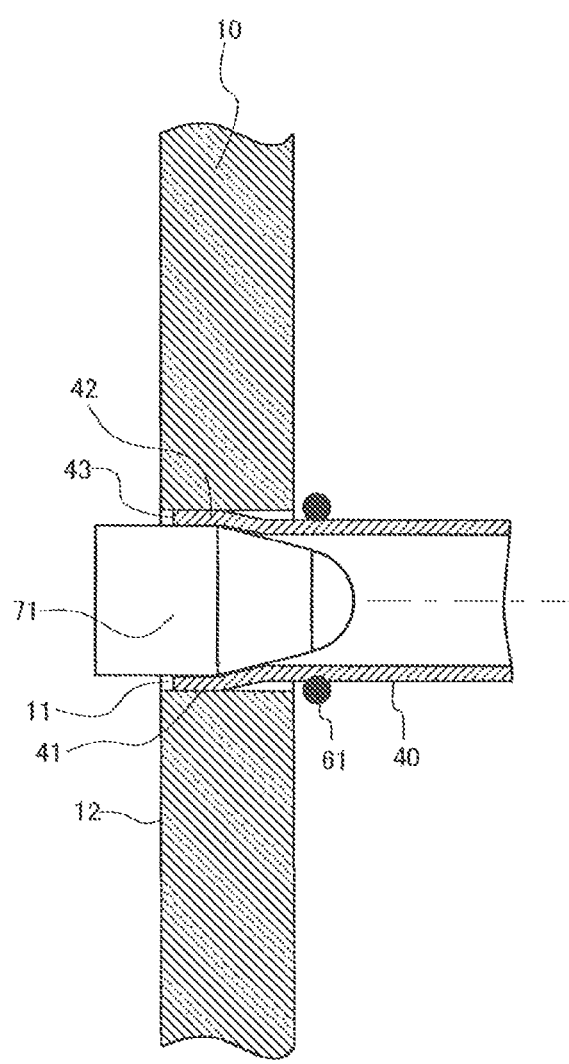
FIG. 10 illustrates the "first pipe fixing step" shown in FIG. 6, continuing from FIG. 9.
Figure 11:
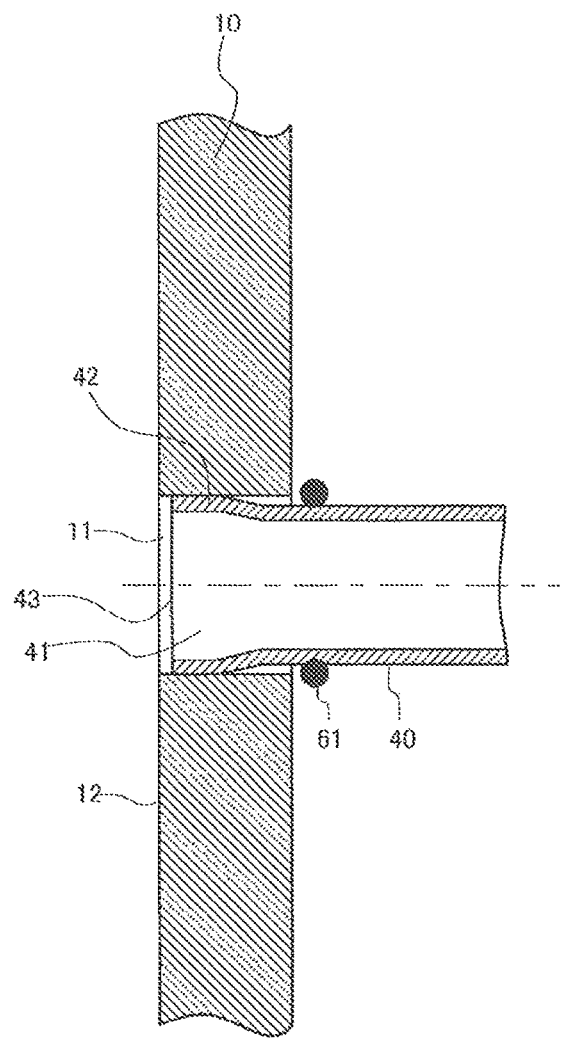
FIG. 11 illustrates the "first pipe fixing step" shown in FIG. 6, continuing from FIG. 10.

After inserting the end portion 41 of the first pipe 40 into the through-hole 11 of the first plate 10, the first pipe 40 is fixed to the through-hole 11 by forming the expanded portion 42 by expanding the end portion 41 of the first pipe 40. As illustrated in FIGS. 9 and 10, in Embodiment 1, the expanded portion 42 is formed by using a jig 71 having a cylindrical outer shape. To be specific, the outer diameter D71 of the jig 71 is larger than the inner diameter C41 of the end portion 41 of the first pipe 40 and smaller than the inner diameter C11 of the through-hole 11 of the first plate 10. Therefore, when the jig 71 is pressed into the end portion 41 of the first pipe 40, a part of the end portion 41 into which the jig 71 is inserted expands due to plastic deformation. Thus, the expanded part becomes the expanded portion 42, and the outer peripheral surface of the expanded portion 42 is pressed against the inner peripheral surface of the through-hole 11. As illustrated in FIG. 11, by forming the expanded portion 42, it is possible to fix the first pipe 40 to the through-hole 11 of the first plate 10 without using a jig for fixing the first plate 10 and the first pipe 40 together.

The expanded portion 42 may be formed by expanding the entirety of the insertion section 41a of the first pipe 40. However, in Embodiment 1, the expanded portion 42 is formed by expanding a part of the insertion section 41a of the first pipe 40. In other words, the length of the expanded portion 42 disposed in the through-hole 11 is smaller than the length of the through-hole 11. By reducing the length of the expanded portion 42, it is possible expand the first pipe 40, by using the jig 71, with a smaller force than in a case where the expanded portion 42 is formed by expanding the entirety of the insertion section 41a of the first pipe 40. Therefore, by reducing the length of the expanded portion 42, it is possible to expand the first pipe 40 by using a smaller device as a device for expanding the first pipe 40 by using the jig 71 than in the case where the expanded portion 42 is formed by expanding the entirety of the insertion section 41a of the first pipe 40. As a result, it is possible to reduce the initial cost of the manufacturing line for manufacturing the stacking-type header 100.

In Embodiment 1, the jig 71 having a cylindrical outer shape is used. However, the expanded portion 42 may be formed by using a jig having an outer shape such that the cross section is substantially polygonal. The order of the first brazing material placing step and first pipe fixing step is not limited to the order in Embodiment 1. The first brazing material placing step may be performed after the first pipe fixing step.

Figure 12:
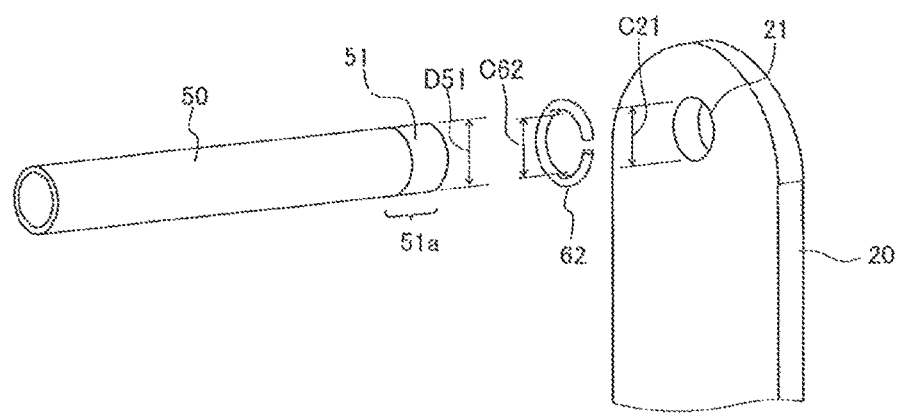
FIG. 12 illustrates a "second brazing material placing step" shown in FIG. 6.

FIG. 12 illustrates a "second brazing material placing step" shown in FIG. 6. FIG. 12 is a perspective view illustrating the second pipe 50, a brazing material 62, and a region in the vicinity of one of the through-holes 21 of the second plate 20.

Figure 13:
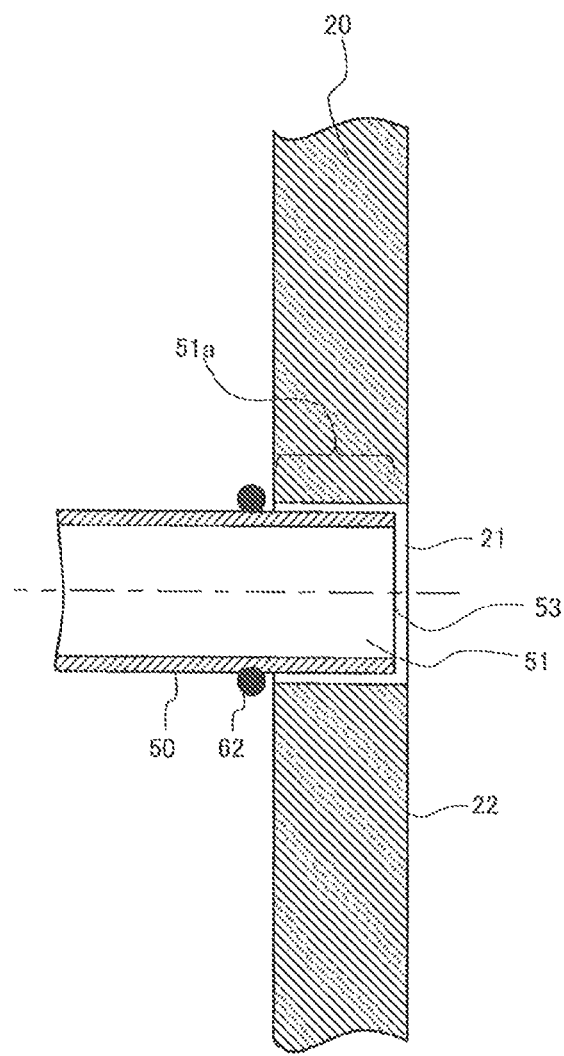
FIG. 13 illustrates a "second pipe fixing step" shown in FIG. 6.

In the second brazing material placing step, an operation of placing the brazing material 62 is performed. The brazing material 62 becomes the brazing portion 62a described above when heated in the joining step described below. In Embodiment 1, an annular brazing material a part of which is cut is used as the brazing material 62. The brazing material 62 having such a shape can be obtained by, for example, forming a bar-shaped brazing material into an annular shape. The inner diameter C62 of the brazing material 62 is slightly smaller than the outer diameter of a part of the second pipe 50 at which the brazing material 62 is to be disposed. Therefore, it is possible to fix the brazing material 62 to a predetermined position by fitting the brazing material 62 onto the part of the second pipe 50 at which the brazing material 62 is to be disposed. As illustrated in FIG. 13 described below, when the second pipe 50 is inserted into the through-hole 11 of the second plate 20 to a fixed position, the brazing material 62 is fixed to a position in the vicinity of the opening of the through-hole 21.

A paste-like brazing material may be used as the brazing material 62. In this case, the brazing material 62 is applied, by using an applicator or other devices, to an outer peripheral surface of the second pipe 50 or a surface of the second plate 20 (surface from which the second pipe 50 protrudes) that is to be positioned in the vicinity of the opening of the through-hole 21 of the second plate 20 when the second pipe 50 is inserted into the through-holes 21 to a fixed position.

FIGS. 13 to 16 illustrate a "second pipe fixing step" shown in FIG. 6. FIGS. 13 to 16 are sectional views illustrating a region in the vicinity of one of the through-holes 21 of the second plate 20 in a state in which the second pipe 50 is inserted into the through-hole 21. Hereinafter, referring to FIGS. 13 to 16 and FIG. 12, the second pipe fixing step will be described.

In the second pipe fixing step, the following operations (3) and (4) are performed:
(3) an operation of inserting the end portion 51 of the second pipe 50 into the through-hole 21 of the second plate 20; and
(4) an operation of fixing the second pipe 50 to the through-hole 21 by forming the expanded portion 52 by expanding the end portion 51 of the second pipe 50.

Figure 14:
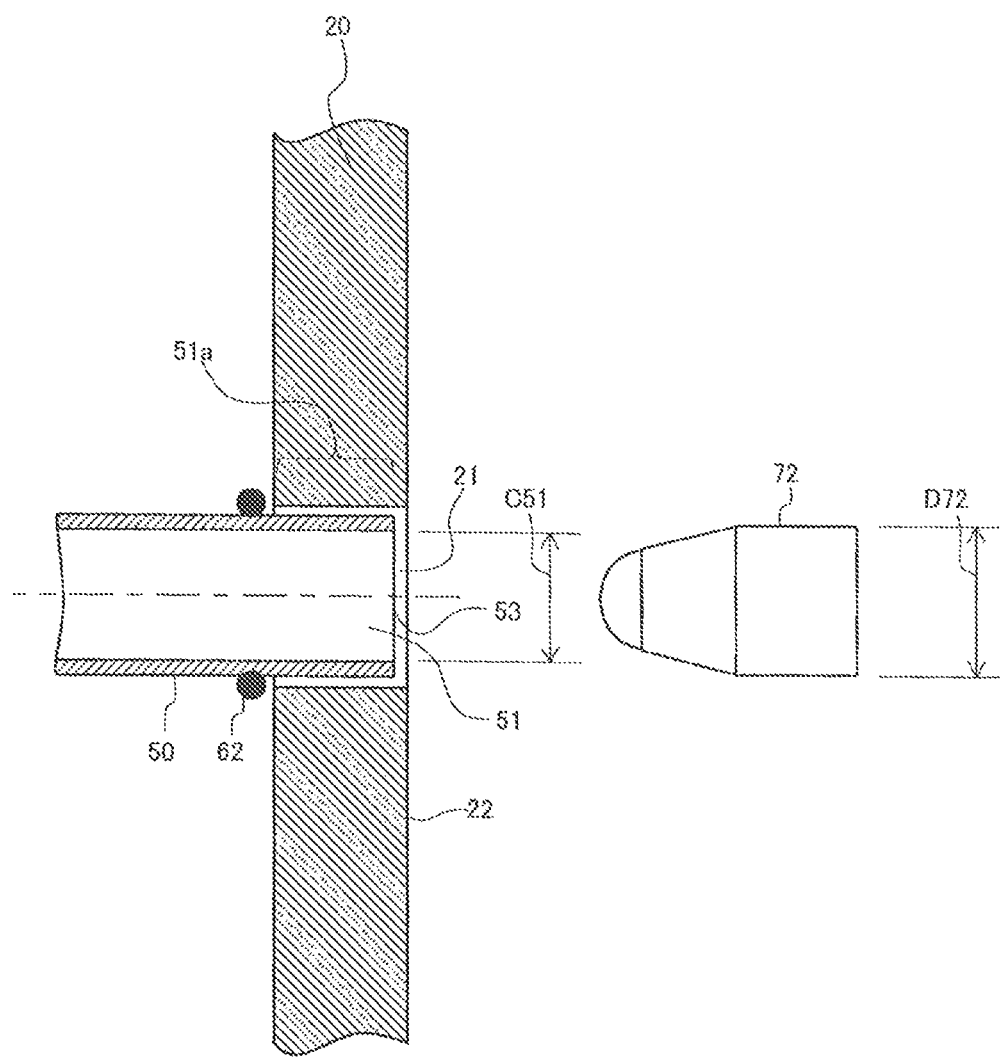
FIG. 14 illustrates the "second pipe fixing step" shown in FIG. 6, continuing from FIG. 13.

As illustrated in FIGS. 13 and 14, when inserting the end portion 51 of the second pipe 50 into the through-hole 21 of the second plate 20, an insertion section 51a of the second pipe 50 is inserted into the through-hole 21. At this time, in Embodiment 1, the end portion 51 of the second pipe 50 is inserted into the through-hole 21 of the second plate 20 until the end surface 53 of the end portion 51 of the second pipe 50 reaches a position in the through-hole 21. As illustrated in FIG. 12, in Embodiment 1, the inner diameter C21 of the through-hole 21 of the second plate 20 is slightly larger than the outer diameter D51 of the insertion section 51a of the second pipe 50. Therefore, the operation of inserting the end portion 51 of the second pipe 50 into the through-hole 21 of the second plate 20 is facilitated, and the efficiency in manufacturing the stacking-type header 100 can be improved. The operation of inserting the end portion 51 of the second pipe 50 into the through-hole 21 of the second plate 20 is performed, for example, by hand. Needless to say, the end portion 51 of the second pipe 50 may be inserted into the through-hole 21 of the second plate 20 by using a machine.

Figure 15:
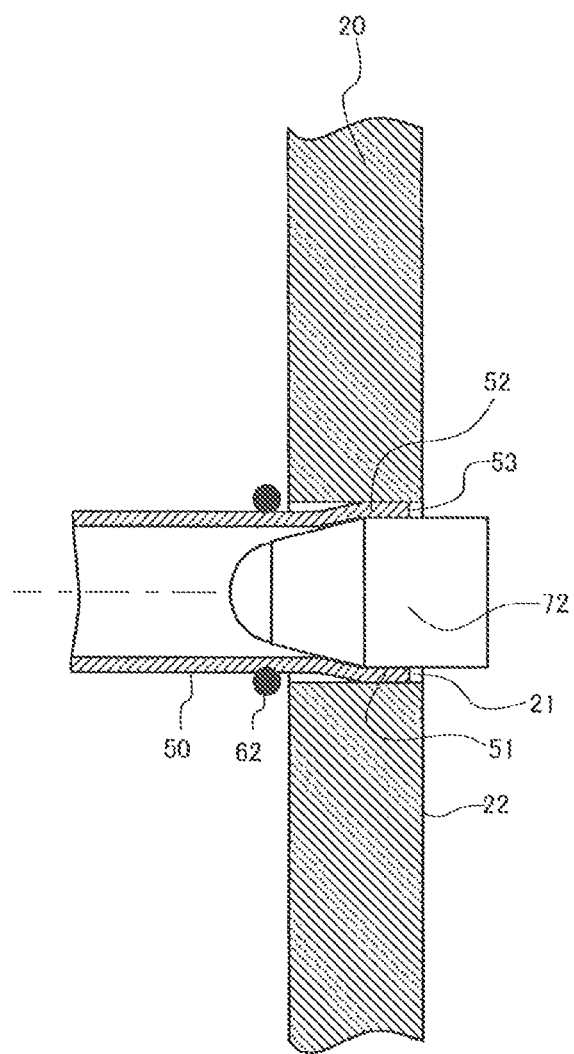
FIG. 15 illustrates the "second pipe fixing step" shown in FIG. 6, continuing from FIG. 14.
Figure 16:
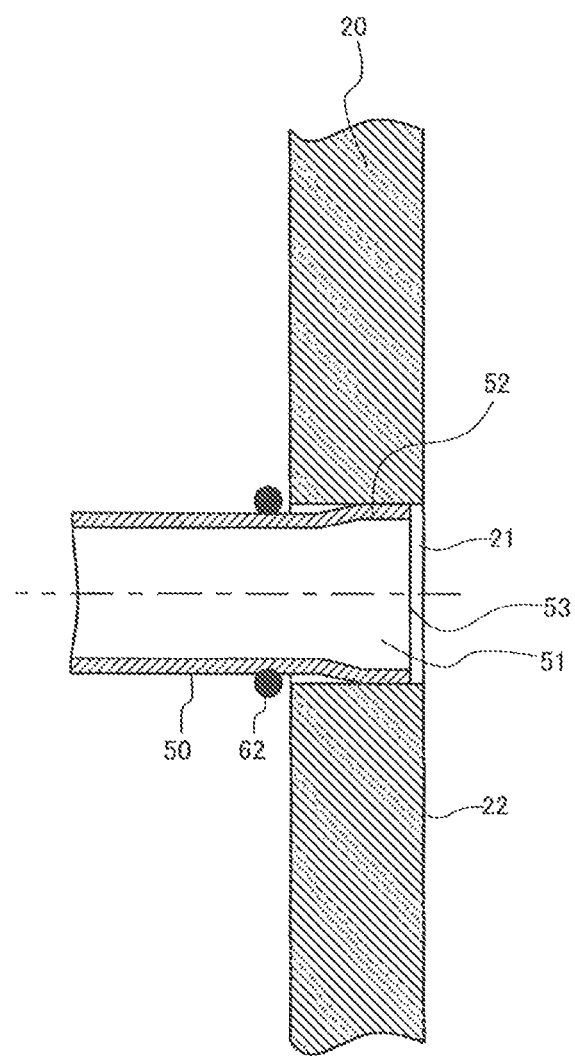
FIG. 16 illustrates the "second pipe fixing step" shown in FIG. 6, continuing from FIG. 15.

After inserting the end portion 51 of the second pipe 50 into the through-hole 21 of the second plate 20, the second pipe 50 is fixed to the through-hole 21 by forming the expanded portion 52 by expanding the end portion 51 of the second pipe 50. As illustrated in FIGS. 14 and 15, in Embodiment 1, the expanded portion 52 is formed by using a jig 72 having a cylindrical outer shape. To be specific, the outer diameter D72 of the jig 72 is larger than the inner diameter C51 of the end portion 51 of the second pipe 50 and smaller than the inner diameter C21 of the through-hole 21 of the second plate 20. Therefore, when the jig 72 is pressed into the end portion 51 of the second pipe 50, a part of the end portion 51 into which the jig 72 is inserted expands due to plastic deformation. Thus, the expanded part becomes the expanded portion 52, and the outer peripheral surface of the expanded portion 52 is pressed against the inner peripheral surface of the through-hole 21. As illustrated in FIG. 16, by forming the expanded portion 52, it is possible to fix the second pipe 50 to the through-hole 21 of the second plate 20 without using a jig for fixing the second plate 20 and the second pipe 50 together.

The expanded portion 52 may be formed by expanding the entirety of the insertion section 51a of the second pipe 50. However, in Embodiment 1, the expanded portion 52 is formed by expanding a part of the insertion section 51a of the second pipe 50. In other words, the length of the expanded portion 52 disposed in the through-hole 21 is smaller than the length of the through-hole 21. By reducing the length of the expanded portion 52, it is possible to expand the second pipe 50, by using the jig 72, with a smaller force than in a case where the expanded portion 52 is formed by expanding the entirety of the insertion section 51a of the second pipe 50. Therefore, by reducing the length of the expanded portion 52, it is possible to expand the second pipe 50 using a smaller device as a device for performing pipe expansion by using the jig 72 than in the case where the expanded portion 52 is formed by expanding the entirety of the insertion section 51a of the second pipe 50. As a result, it is possible to reduce the initial cost of the manufacturing line for manufacturing the stacking-type header 100.

In Embodiment 1, the jig 72 having a cylindrical outer shape is used. However, the expanded portion 52 may be formed by using a jig having an outer shape such that the cross section is substantially polygonal. The order of performing the second brazing material placing step and the second pipe fixing step is not limited to the order in Embodiment 1. The second brazing material placing step may be performed after the second pipe fixing step. The order of performing the first brazing material placing step and the first pipe fixing step and performing the second brazing material placing step and the second pipe fixing step is not limited to the order in Embodiment 1. For example, the second brazing material placing step and the second pipe fixing step may be performed simultaneously with the first brazing material placing step and the first pipe fixing step. For example, the first brazing material placing step and the first pipe fixing step may be performed after performing the second brazing material placing step and the second pipe fixing step.

Figure 17:
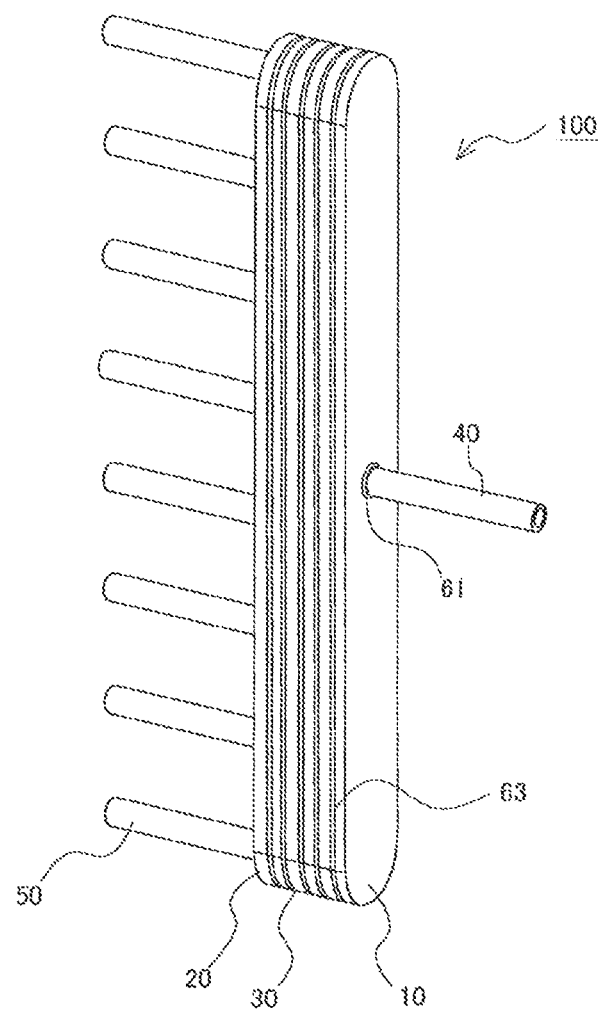
FIG. 17 illustrates a "stacking step" shown in FIG. 6.

FIG. 17 illustrates a "stacking step" shown in FIG. 6. FIG. 17 is a perspective view illustrating a state in which the first plate 10, the third plates 30, and the second plate 20 are stacked.

The stacking step is performed after the first brazing material placing step, the first pipe fixing step, the second brazing material placing step, and the second pipe fixing step. The stacking step is a step of stacking the first plate 10 to which the first pipe 40 is fixed, the third plates 30, and the second plate 20 to which the second pipes 50 are fixed. Before stacking these plates, a brazing material 63 is placed on a surface of one of adjacent plates. For example, when using a paste-like brazing material 63, the brazing material 63 is applied to a surface of one of adjacent plates. Subsequently, the plates are stacked. The brazing material 63 becomes the brazing portion 63a described above when heated in the joining step described below.

In Embodiment 1, as described above, the end surface 43 of the end portion 41 of the first pipe 40 is positioned in the through-hole 11 of the first plate 10. Therefore, when stacking the first plate 10 on one of the third plates 30, the third plate 30 and the first pipe 40 do not interfere with each other, because the end portion 41 of the first pipe 40 does not protrude toward the third plate 30. Therefore, when the first plate 10 is stacked on the third plate 30, the gap between these plates does not become excessively large. Accordingly, in the joining step described below, defect in the brazed joint between the first plate 10 and the third plate 30 is not likely to occur, and the reliability of the stacking-type header 100 can be improved.

The end surface 43 of the end portion 41 of the first pipe 40 may be disposed at the same position as a surface 12 (see FIG. 8 and other figures) of the first plate 10 facing the third plate 30. Also with such a structure, when stacking the first plate 10 on the third plate 30, the third plate 30 and the first pipe 40 do not interfere with each other. Therefore, when the first plate 10 is stacked on the third plate 30, the gap between these plates does not become excessively large. Accordingly, in the joining step described below, defect in the brazed joint between the first plate 10 and the third plate 30 is not likely to occur, and the reliability of the stacking-type header 100 can be improved.

Likewise, in Embodiment 1, as described above, the end surface 53 of the end portion 51 of the second pipe 50 is positioned in the through-hole 21 of the second plate 20. Therefore, when stacking the second plate 20 on one of the third plates 30, the third plate 30 and the second pipe 50 do not interfere with each other, because the end portion 51 of the second pipe 50 does not protrude toward the third plate 30. Therefore, when the second plate 20 is stacked on the third plate 30, the gap between these plates does not become excessively large. Accordingly, in the joining step described below, defect in the brazed joint between the second plate 20 and the third plate 30 is not likely to occur, and the reliability of the stacking-type header 100 can be improved.

The end surface 53 of the end portion 51 of the second pipe 50 may be disposed at the same position as a surface 22 (see FIG. 13 and other figures) of the second plate 20 facing the third plate 30. Also with such a structure, when stacking the second plate 20 on the third plates 30, the third plate 30 and the second pipe 50 do not interfere with each other. Therefore, when the second plate 20 is stacked on the third plate 30, the gap between these plates does not become excessively large. Accordingly, in the joining step described below, defect in the brazed joint between the second plate 20 and the third plate 30 is not likely to occur, and the reliability of the stacking-type header 100 can be improved.

After the stacking step, a "joining step" shown in FIG. 6 is performed. In the joining step, first, the first plate 10, the third plates 30, and the second plate 20, which have been stacked in the stacking step, are fixed (clamped) together by using a jig (not shown). In existing stacking-type headers, before the joining step, the first pipe is not fixed to the through-hole of the first plate. Therefore, in existing stacking-type headers, when fixing the stacked plates together by using a jig, the first pipe and the first plate are also fixed together by using another jig. Likewise, in existing stacking-type headers, before the joining step, the second pipes are not fixed to the through-holes of the second plate. Therefore, in existing stacking-type headers, when fixing the stacked plates together by using a jig, the second pipes and the second plate are also fixed together by using another jig. It takes long time to perform an operation of fixing the first plate and the first pipe together by using a jig and an operation of fixing the second plate and the second pipes together by using a jig.

In contrast, in the stacking-type header 100 according to Embodiment 1, before the joining step, the first pipe 40 is fixed to the through-hole 11 of the first plate 10 by the expanded portion 42 of the first pipe 40. Therefore, the stacking-type header 100 according to Embodiment 1 does not require a jig for fixing the first plate 10 and the first pipe 40 together when fixing the stacked plates together by using a jig. Likewise, in the stacking-type header 100 according to Embodiment 1, before the joining step, the second pipes 50 are fixed to the through-holes 21 of the second plate 20 by the expanded portions 52 of the second pipes 50. Therefore, the stacking-type header 100 according to Embodiment 1 does not require a jig for fixing the second plate 20 and the second pipes 50 together when fixing the stacked plates together by using a jig.

Therefore, regarding the stacking-type header 100 according to Embodiment 1, it is not necessary to perform the operation of fixing the first plate and the first pipe together by using a jig and the operation of fixing the second plate and the second pipes together by using a jig, which take a long time for existing stacking-type headers. The time required to perform the operation of fixing the first plate 10 and the first pipe 40 together by pipe expansion and the operation of fixing the second plate 20 and the second pipes 50 together by pipe expansion according to Embodiment 1 is shorter than the time required to perform the operation of fixing the first plate and the first pipe together by using a jig and the operation of fixing the second plate and the second pipes together by using a jig for forming existing stacking-type headers. Accordingly, the stacking-type header 100 according to Embodiment 1 can reduce the time required to join the components of the stacking-type header 100 before melting brazing materials to form brazed joints and can improve the efficiency in manufacturing the stacking-type header 100.

In the joining step, the first plate 10, the third plates 30, and the second plate 20, which have been stacked in the stacking step, are fixed together by using a jig (not shown); and then these components are heated. Thus, brazing materials placed between the first plate 10 and one of the third plates 30, between the third plates 30, between the second plate 20 and one of the third plates 30, between the through-hole 11 of the first plate 10 and the first pipe 40, and between the through-holes 21 of the second plate 20 and the second pipes 50 are melted and these components are brazed to each other. Thus, the stacking-type header 100 is completed.

With existing stacking-type headers, as described above, it is necessary to use a jig for fixing the first plate and the first pipe together and a jig for fixing the second plate and the second pipes together. Therefore, when melting the brazing materials in the joining step, it is also necessary to heat these jigs. Therefore, the heating time is increased by a time corresponding to the heat capacities for heating these jigs. By contrast, the stacking-type header 100 according to Embodiment 1 does not require a jig for fixing the first plate 10 and the first pipe 40 together and a jig for fixing the second plate 20 and the second pipes 50 together. Therefore, when melting the brazing material in the joining step, it is possible to make the heating time shorter than before. Accordingly, the efficiency in manufacturing the stacking-type header 100 can be improved.

As described above, the stacking-type header 100 according to Embodiment 1 does not require a jig for fixing the first plate 10 and the first pipe 40 together and a jig for fixing the second plate 20 and the second pipes 50 together. Therefore, when melting the brazing material in the joining step, it is possible to make the heating time shorter than before. Accordingly, the efficiency in manufacturing the stacking-type header 100 can be improved. The stacking-type header 100 according to Embodiment 1 does not require an operation of fixing the first plate and the first pipe together by using a jig and the operation of fixing the second plate and the second pipes together by using a jig, which take a long time for existing stacking-type headers. Therefore, it is possible to reduce the time required to join the components of the stacking-type header 100 before melting brazing materials to braze the components to each other. Also in this respect, the stacking-type header 100 according to Embodiment 1 can improve the efficiency in manufacturing the stacking-type header 100.

Embodiment 2

A large diameter portion 45 described below may be formed in the first pipe 40 shown in Embodiment 1. A large diameter portion 55 described below may be formed in each of the second pipes 50 shown in Embodiment 1. By forming the large diameter portion 45 and the large diameter portion 55, the reliability of brazed joints can be improved. Note that elements of Embodiment 2 that will not be specifically described are similar to those of Embodiment 1, and the same functions and the same elements will be denoted by the same numerals.

Figure 18:
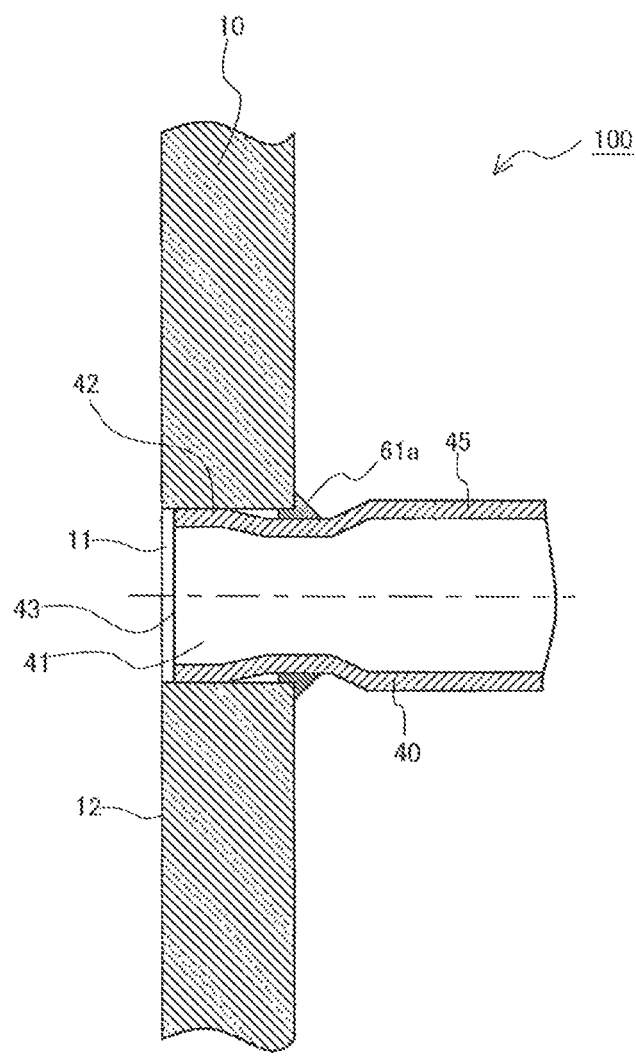
FIG. 18 is a sectional view illustrating a region in the vicinity of a joint portion between a first plate and a first pipe of a stacking-type header according to Embodiment 2 of the present invention.
Figure 19:
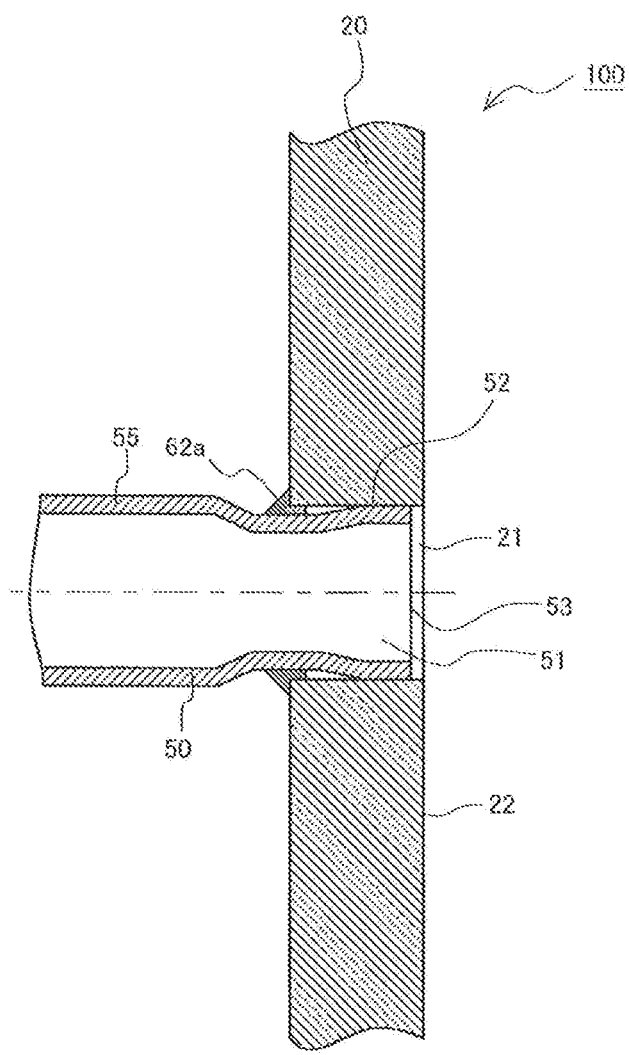
FIG. 19 is a sectional view illustrating a region in the vicinity of a joint portion between a second plate and a second pipe of the stacking-type header according to Embodiment 2 of the present invention.
Figure 20:
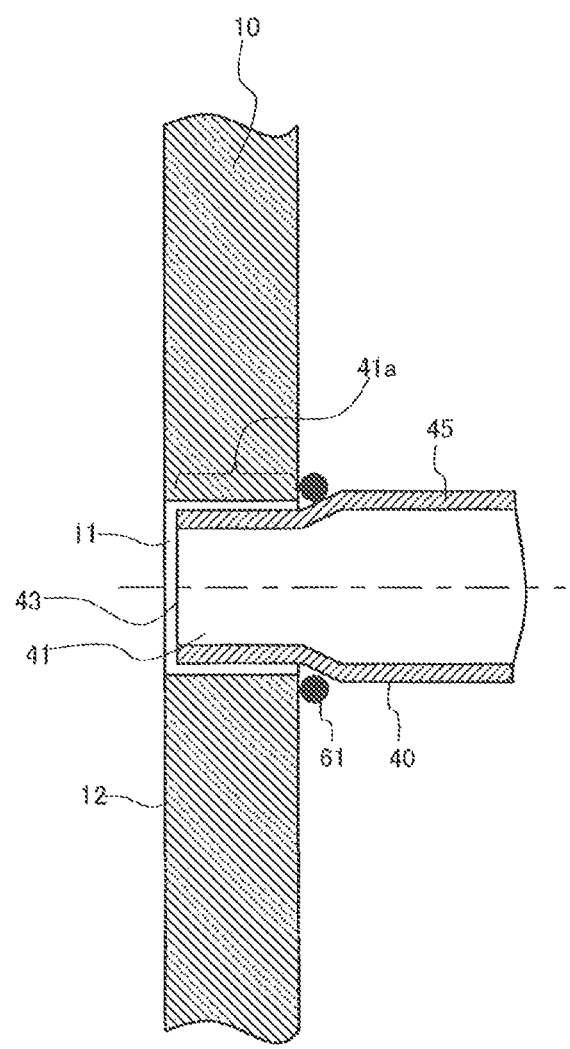
FIG. 20 illustrates a "first brazing material placing step" and a "first pipe fixing step" of the stacking-type header according to Embodiment 2 of the present invention.
Figure 21:
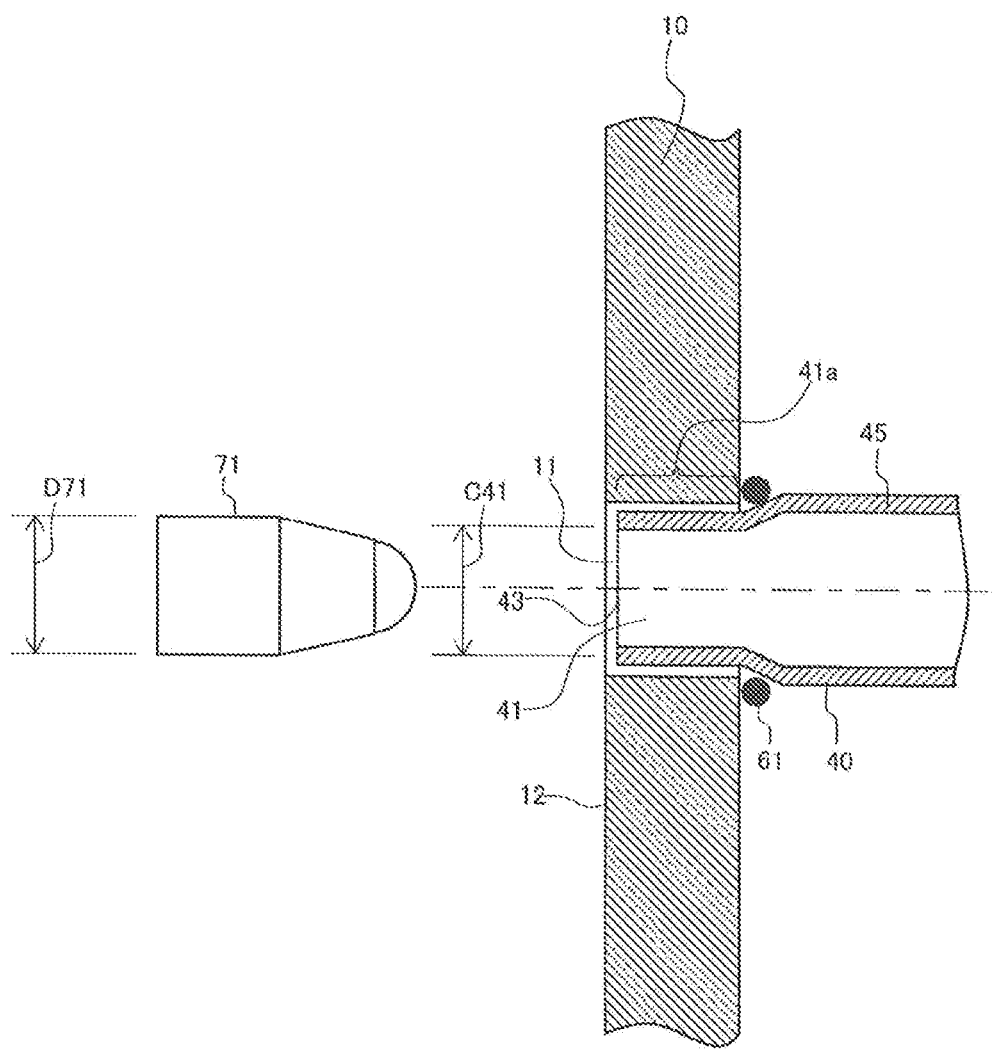
FIG. 21 illustrates the "first brazing material placing step" and the "first pipe fixing step" of the stacking-type header according to Embodiment 2 of the present invention, continuing from FIG. 20.
Figure 22:
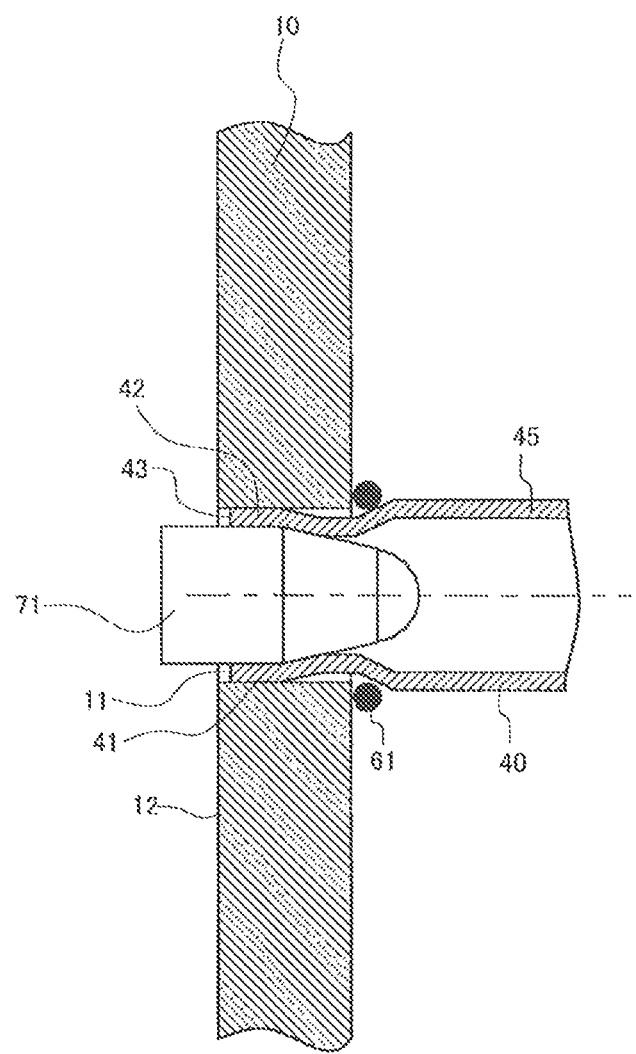
FIG. 22 illustrates the "first brazing material placing step" and the "first pipe fixing step" of the stacking-type header according to Embodiment 2 of the present invention, continuing from FIG. 21.

FIG. 18 is a sectional view illustrating a region in the vicinity of a joint portion between a first plate and a first pipe of a stacking-type header according to Embodiment 2 of the present invention. FIG. 19 is a sectional view illustrating a region in the vicinity of a joint portion between a second plate and a second pipe of the stacking-type header according to Embodiment 2 of the present invention.

A first pipe 40 of the stacking-type header 100 according to Embodiment 2 includes the large diameter portion 45 in a section thereof that is not inserted into the through-hole 11 of the first plate 10, that is, in a section thereof that protrudes from the first plate 10 in a direction away from the third plate 30. The large diameter portion 45 has an outer diameter larger than the inner diameter of the through-hole 11. Likewise, a second pipe 50 of the stacking-type header 100 according to Embodiment 2 includes the large diameter portion 55 in a section thereof that is not inserted into the through-hole 21 of the second plate 20, that is, in a section thereof that protrudes from the second plate 20 in a direction away from the third plate 30. The large diameter portion 55 has an outer diameter larger than the inner diameter of the through-hole 21. In other respects, the stacking-type header 100 according to Embodiment 2 is similar to Embodiment 1.

The large diameter portion 45 corresponds to a first large diameter portion in the present invention. The large diameter portion 55 corresponds to a second large diameter portion in the present invention.

[Method of Manufacturing Stacking-Type Header 100]

Next, a method of manufacturing the stacking-type header 100 according to Embodiment 2 will be described. When manufacturing the stacking-type header 100 according to Embodiment 2, as described below, a first pipe fixing step is performed after a first brazing material placing step. When manufacturing the stacking-type header 100 according to Embodiment 2, as described below, a second pipe fixing step is performed after a second brazing material placing step.

FIGS. 20 to 23 illustrate a "first brazing material placing step" and a "first pipe fixing step" of the stacking-type header according to Embodiment 2 of the present invention. FIGS. 20 to 23 are sectional views illustrating a region in the vicinity of the through-hole 11 of the first plate 10 in a state in which the first pipe 40 is inserted into the through-hole 11.

In the first brazing material placing step, a brazing material 61 having an annular shape is attached to a part of the first pipe 40, the part being positioned closer to the end portion 41 than the large diameter portion 45 is to the end portion 41. The brazing material 61 has an inner diameter such that, when inserting the end portion 41 of the first pipe 40 into the through-hole 11 of the first plate 10, the first pipe 40 can be inserted in a state in which the brazing material 61 is in contact with the surface of the first plate 10. That is, the brazing material 61 has an inner diameter such that, when inserting the end portion 41 of the first pipe 40 into the through-hole 11 of the first plate 10, the brazing material 61 is movable along the part of the first pipe 40 that is positioned closer to the end portion 41 than the large diameter portion 45 is to the end portion 41. For example, the inner diameter of the brazing material 61 is slightly larger than the outer diameter of the part of the first pipe 40 that is positioned closer to the end portion 41 than the large diameter portion 45 is to the end portion 41. An annular brazing material a part of which is cut may be used as the brazing material 61. In this case, provided that it is possible to insert the first pipe 40 in a state in which the brazing material 61 is in contact with the surface of the first plate 10 when inserting the end portion 41 of the first pipe 40 into the through-hole 11 of the first plate 10, the inner diameter of the brazing material 61 may be smaller than or equal to the outer diameter of the part of the first pipe 40 that is positioned closer to the end portion 41 than the large diameter portion 45 is to the end portion 41.

As illustrated in FIGS. 20 to 23, after the first brazing material placing step, the first pipe fixing step is performed in a similar way to Embodiment 1. That is, the insertion section 41a of the end portion 41 of the first pipe 40 is inserted into the through-hole 11 of the first plate 10. After inserting the end portion 41 of the first pipe 40 into the through-hole 11 of the first plate 10, a jig 71 is pressed into the end portion 41 of the first pipe 40 to form the expanded portion 42 and to press the outer peripheral surface of the expanded portion 42 against the inner peripheral surface of the through-hole 11.

Figure 23:
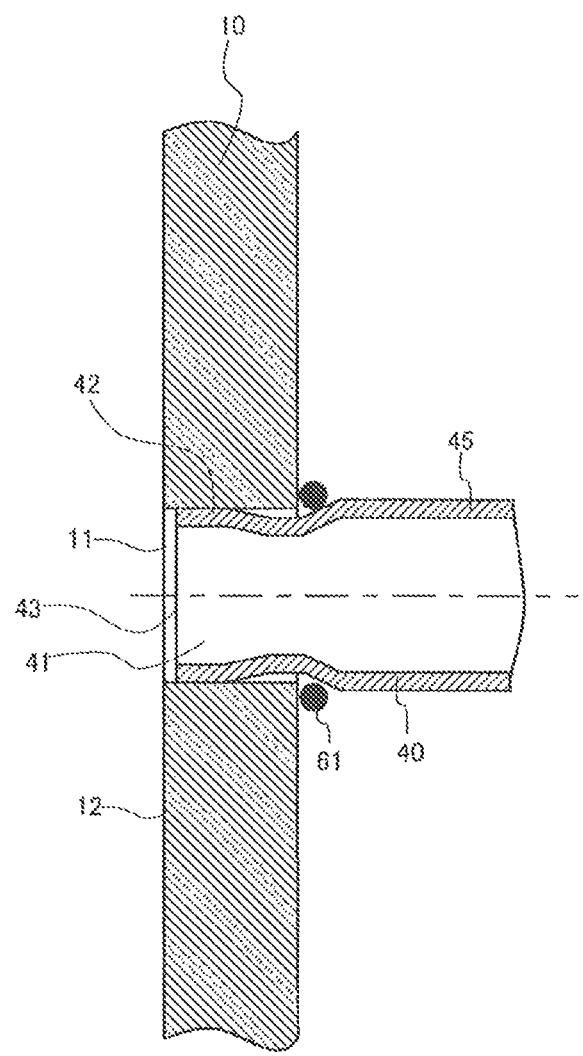
FIG. 23 illustrates the "first brazing material placing step" and the "first pipe fixing step" of the stacking-type header according to Embodiment 2 of the present invention, continuing from FIG. 22.
Figure 24:
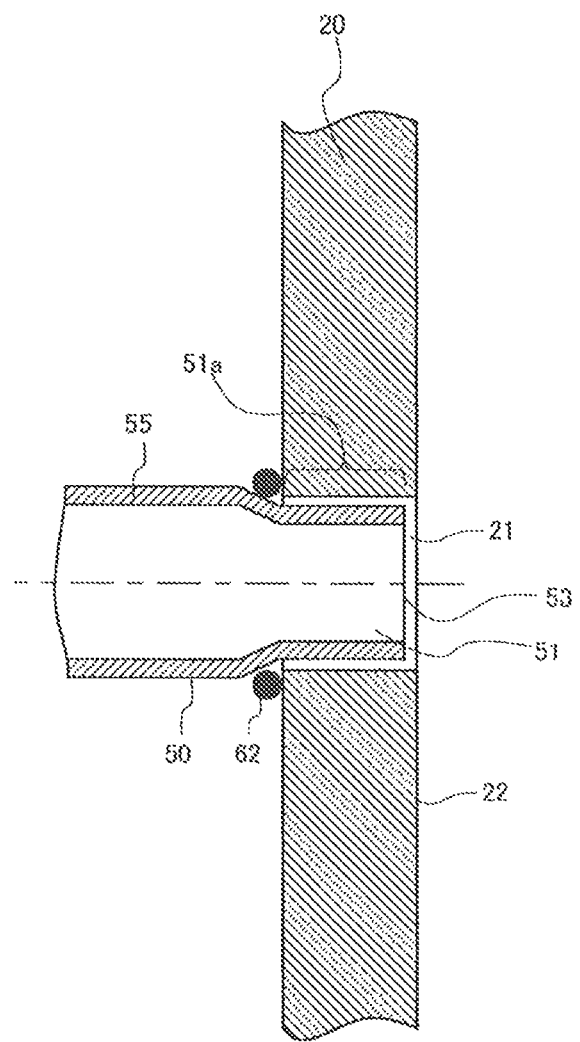
FIG. 24 illustrates a "second brazing material placing step" and a "second pipe fixing step" of the stacking-type header according to Embodiment 2 of the present invention.
Figure 25:
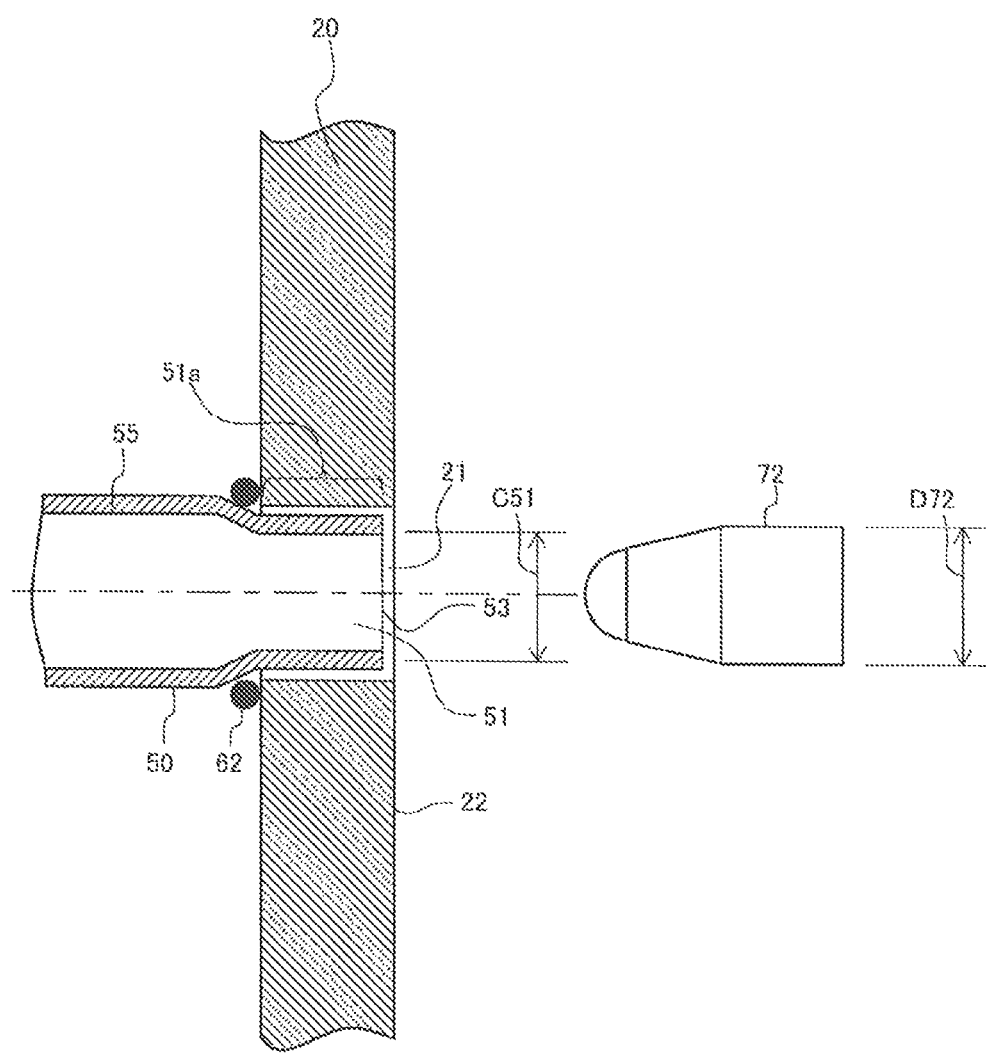
FIG. 25 illustrates the "second brazing material placing step" and the "second pipe fixing step" of the stacking-type header according to Embodiment 2 of the present invention, continuing from FIG. 24.
Figure 26:
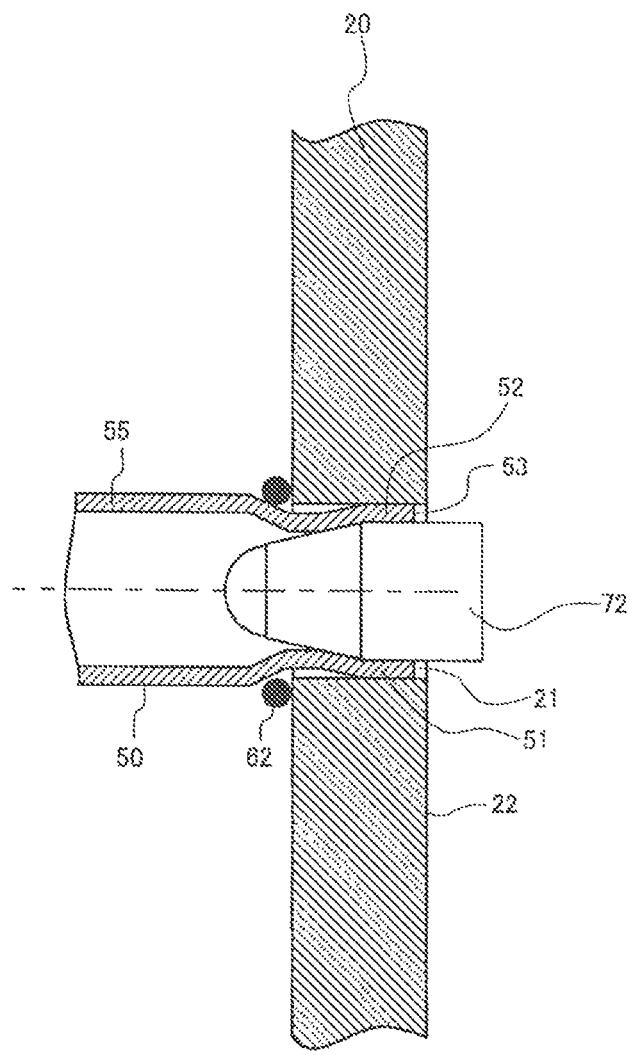
FIG. 26 illustrates the "second brazing material placing step" and the "second pipe fixing step" of the stacking-type header according to Embodiment 2 of the present invention, continuing from FIG. 25.

As described above, when the end portion 41 of the first pipe 40 is inserted into the through-hole 11 of the first plate 10, the brazing material 61 is movable along the part of the first pipe 40 that is positioned closer to the end portion 41 than the large diameter portion 45 is to the end portion 41. Therefore, as illustrated in FIG. 23, when the first pipe 40 is fixed to the through-hole 11 of the first plate 10 by the expanded portion 42, the brazing material 61 is held between the first plate 10 and the large diameter portion 45 of the first pipe 40. Accordingly, when the first pipe 40 is fixed to the through-hole 11 of the first plate 10 by the expanded portion 42, the brazing material 61 can be automatically placed in the vicinity of a joint portion between the through-hole 11 of the first plate 10 and the first pipe 40, in other words, in the vicinity of the opening of the through-hole 11. Therefore, in the joining step, the reliability of the brazed joint between the through-hole 11 of the first plate 10 and the first pipe 40 can be improved.

FIGS. 24 to 27 illustrate a "second brazing material placing step" and a "second pipe fixing step" of the stacking-type header according to Embodiment 2 of the present invention. FIGS. 24 to 27 are sectional views illustrating a region in the vicinity of one of the through-holes 21 of the second plate 20 in a state in which the second pipe 50 is inserted into the through-hole 21.

In the second brazing material placing step, a brazing material 62 having an annular shape is attached to a part of the second pipe 50, the part being positioned closer to the end portion 51 than the large diameter portion 55 is to the end portion 51. The brazing material 62 has an inner diameter such that, when inserting the end portion 51 of the second pipe 50 into the through-hole 21 of the second plate 20, the second pipe 50 can be inserted in a state in which the brazing material 62 is in contact with the surface of the second plate 20. That is, the brazing material 62 has an inner diameter such that, when inserting the end portion 51 of the second pipe 50 into the through-hole 21 of the second plate 20, the brazing material 62 is movable along the part of the second pipe 50 that is positioned closer to the end portion 51 than the large diameter portion 55 is to the end portion 51. For example, the inner diameter of the brazing material 62 is slightly larger than the outer diameter of the part of the second pipe 50 that is positioned closer to the end portion 51 than the large diameter portion 55 is to the end portion 51. An annular brazing material a part of which is cut may be used as the brazing material 62. In this case, provided that it is possible to insert the second pipe 50 in a state in which the brazing material 62 is in contact with a surface of the second plate 20 when inserting the end portion 51 of the second pipe 50 into the through-hole 21 of the second plate 20, the inner diameter of the brazing material 62 may be smaller than or equal to the outer diameter of the part of the second pipe 50 that is positioned closer to the end portion 51 than the large diameter portion 55 is to the end portion 51.

As illustrated in FIGS. 24 to 27, after the first brazing material placing step, a second pipe fixing step is performed in a similar way to Embodiment 1. That is, the insertion section 51a of the end portion 51 of the second pipe 50 is inserted into the through-hole 21 of the second plate 20. After inserting the end portion 51 of the second pipe 50 into the through-hole 21 of the second plate 20, the jig 72 is pressed into the end portion 51 of the second pipe 50 to form the expanded portion 52 and to press the outer peripheral surface of the expanded portion 52 against the inner peripheral surface of the through-hole 21.

Figure 27:
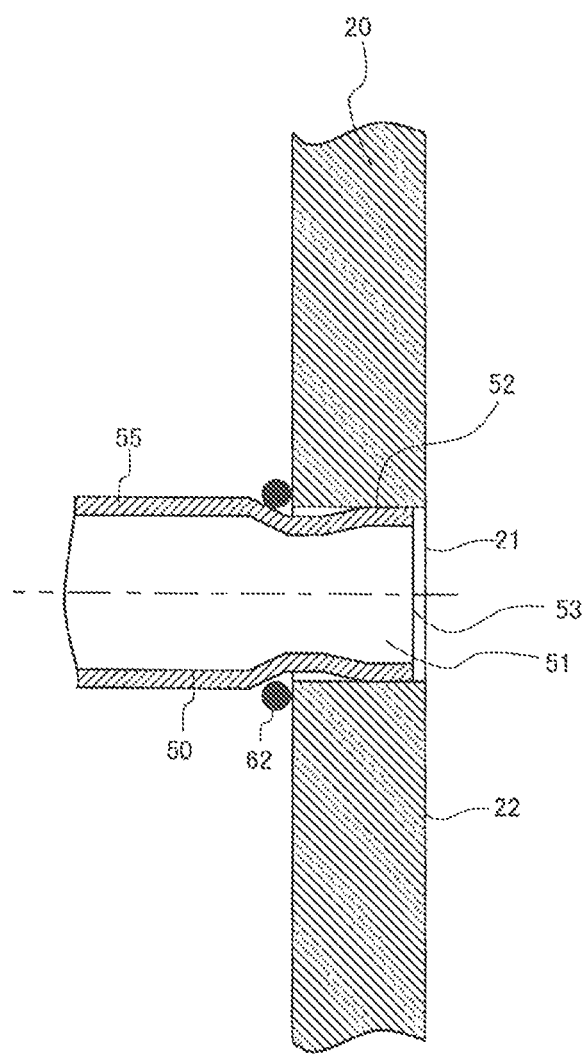
FIG. 27 illustrates the "second brazing material placing step" and the "second pipe fixing step" of the stacking-type header according to Embodiment 2 of the present invention, continuing from FIG. 26.

As described above, when the end portion 51 of the second pipe 50 is inserted into the through-hole 21 of the second plate 20, the brazing material 62 is movable along the part of the second pipe 50 that is positioned closer to the end portion 51 than the large diameter portion 55 is to the end portion 51. Therefore, as illustrated in FIG. 27, when the second pipe 50 is fixed to the through-hole 21 of the second plate 20 by the expanded portion 52, the brazing material 62 is held between the second plate 20 and the large diameter portion 55 of the second pipes 50. Accordingly, when the second pipe 50 is fixed to the through-hole 21 of the second plate 20 by the expanded portion 52, the brazing material 62 can be automatically placed in the vicinity of a joint portion between the through-hole 21 of the second plate 20 and the second pipe 50, in other words, in the vicinity of the opening of the through-hole 21. Therefore, in the joining step, the reliability of the brazed joint between the through-hole 21 of the second plate 20 and the second pipe 50 can be improved.

As described above, the stacking-type header 100 according to Embodiment 2 has the aforementioned advantages, in addition to the advantages described in Embodiment 1. That is, in the stacking-type header 100 according to Embodiment 2, the first pipe 40 includes the large diameter portion 45. Therefore, the reliability of the brazed joint between the through-hole 11 of the first plate 10 and the first pipe 40 can be improved. Moreover, in the stacking-type header 100 according to Embodiment 2, the second pipes 50 include the large diameter portions 55. Therefore, the reliability of the brazed joints between the through-holes 21 of the second plate 20 and the second pipes 50 can be improved. That is, the reliability of the stacking-type header 100 according to Embodiment 2 can be further improved compared with the stacking-type header 100 described in Embodiment 1.

REFERENCE SIGNS LIST 10 first plate 11 through-hole 12 surface 20 second plate 21 through-hole 22 surface 30 third plate 31 flow path 31a through-hole 31b groove 31c through-hole 31d groove 31e through-hole 31f groove 31g through-hole 40 first pipe 41 end portion 41a insertion section 42 expanded portion 43 end surface 45 large diameter portion 50 second pipe 51 end portion 51a insertion section 52 expanded portion 53 end surface large diameter portion 61 brazing material 61a brazing portion 62 brazing material 62a brazing portion 63 brazing material 63a brazing portion jig 72 jig 100 stacking-type header C11 inner diameter C21 inner diameter C41 inner diameter D41 outer diameter C51 inner diameter D51 outer diameter C61 inner diameter C62 inner diameter D71 outer diameter D72 outer diameter.

The invention claimed is:

1. A stacking-type header comprising:
   a first plate having a first through-hole;
   a second plate having a plurality of second through-holes;
   a third plate in which a flow path that communicates between the first through-hole and the second through-holes is formed, the third plate being disposed between the first plate and the second plate;
   a first pipe including a first end portion inserted into the first through-hole;
   a plurality of second pipes each including a second end portion inserted into a corresponding one of the second through-holes; and
   brazing portions provided between the first plate and the third plate, between the second plate and the third plate, between the first through-hole and the first pipe, and between the second through-holes and the second pipes,
   wherein the first pipe includes a first expanded portion in the first end portion, the first expanded portion having an outer peripheral surface pressed against and in direct contact with an inner peripheral surface of the first through-hole,
   wherein each of the second pipes includes a second expanded portion in the second end portion, the second expanded portion having an outer peripheral surface pressed against and in direct contact with an inner peripheral surface of a corresponding one of the second through-holes, and
   wherein the first pipe includes a first large diameter portion in a section thereof that is not inserted into the first through-hole, the first large diameter portion having an outer diameter larger than an inner diameter of the first through-hole.

2. The stacking-type header of claim 1, wherein an end surface of the first end portion of the first pipe is disposed at a same position as a surface of the first plate facing the third plate or is positioned in the first through-hole.

3. The stacking-type header of claim 1, wherein an end surface of the second end portion of each of the second pipes is disposed at a same position as a surface of the second plate facing the third plate or is positioned in a corresponding one of the second through-holes.

4. The stacking-type header of claim 1, wherein a length of the first expanded portion disposed in the first through-hole is smaller than a length of the first through-hole.

5. The stacking-type header of claim 1, wherein a length of the second expanded portion disposed in the second through-hole is smaller than a length of the second through-hole.

6. The stacking-type header of claim 1, wherein the second pipes each include a second large diameter portion in a section thereof that is not inserted into a corresponding one of the second through-holes, the second large diameter portion having an outer diameter larger than an inner diameter of the second through-hole.

7. A method of manufacturing the stacking-type header of claim 1,
   the method comprising:
   a first brazing material placing step of placing a brazing material for joining the first through-hole and the first pipe to each other;
   a first pipe fixing step of inserting the first end portion of the first pipe into the first through-hole of the first plate and fixing the first pipe by expanding the first end portion to form the first expanded portion;

a second brazing material placing step of placing a brazing material for joining each of the second through-holes and a corresponding one of the second pipes to each other;

a second pipe fixing step of inserting the second end portion of each of the second pipes into a corresponding one of the second through-holes of the second plate and fixing the second pipe by expanding the second end portion to form the second expanded portion;

a stacking step of stacking the first plate to which the first pipe is fixed, the third plate, and the second plate to which the second pipes are fixed, in a state in which brazing materials are disposed between adjacent ones of the plates; and a joining step of fixing the first plate, the third plate, and the second plate that are stacked by using a jig, and heating the first plate, the third plate, and the second plate and brazing the first plate and the third plate to each other; the second plate and the third plate to each other; the first through-hole and the first pipe to each other, and each of the second through-holes and a corresponding one of the second pipes to each other, the joining step being performed after the first pipe fixing step, the first brazing material placing step, the second pipe fixing step, the second brazing material placing step, and the stacking step, and wherein the first pipe includes a first large diameter portion in a section thereof that is not inserted into the first through-hole, the first large diameter portion having an outer diameter larger than an inner diameter of the first through-hole, wherein, in the first brazing material placing step, an annular brazing material is attached to a part of the first pipe, the part being positioned closer to the first end portion than the first large diameter portion is to the first end portion, and wherein, after the first brazing material placing step, the first pipe fixing step is performed so that the annular brazing material is held between the first plate and the first large diameter portion of the first pipe.

8. The method of manufacturing the stacking-type header of claim 7, wherein the second pipes each include a second large diameter portion in a section thereof that is not inserted into a corresponding one of the second through-holes, the second large diameter portion having an outer diameter larger than an inner diameter of the second through-hole, wherein, in the second brazing material placing step, an annular brazing material is attached to a part of the second pipe, the part being positioned closer to the second end portion than the second large diameter portion is to the second end portion, and wherein, after the second brazing material placing step, the second pipe fixing step is performed so that the annular brazing material is held between the second plate and the second large diameter portion of the second pipe.

* * * * *